(12) United States Patent
Uken et al.

(10) Patent No.: US 9,352,692 B2
(45) Date of Patent: May 31, 2016

(54) VEHICLE VISION SYSTEM WITH CAMERA AND MIRROR MOUNT

(71) Applicant: MAGNA MIRRORS OF AMERICA, INC., Holland, MI (US)

(72) Inventors: John T. Uken, Jenison, MI (US); Craig Kendall, Grand Haven, MI (US); Jeremy R. Shooks, Hastings, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/641,811

(22) Filed: Mar. 9, 2015

(65) Prior Publication Data

US 2015/0251605 A1  Sep. 10, 2015

Related U.S. Application Data

(60) Provisional application No. 61/973,923, filed on Apr. 2, 2014, provisional application No. 61/950,262, filed on Mar. 10, 2014.

(51) Int. Cl.

| | |
|---|---|
| *B60R 11/04* | (2006.01) |
| *B60R 1/12* | (2006.01) |
| *B60R 1/04* | (2006.01) |
| *B60R 11/00* | (2006.01) |
| *B60R 19/28* | (2006.01) |
| *B60R 22/24* | (2006.01) |
| *B60R 19/46* | (2006.01) |

(Continued)

(52) U.S. Cl.
CPC ... *B60R 1/12* (2013.01); *B60R 1/04* (2013.01); *B60R 11/04* (2013.01); *B60R 19/28* (2013.01); *B60R 19/46* (2013.01); *B60R 2001/1253* (2013.01); *B60R 2011/0033* (2013.01); *B60R 2011/0066* (2013.01); *B60R 2011/0077* (2013.01); *B60R 2022/4406* (2013.01); *B60S 1/0881* (2013.01); *B60S 1/0885* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

| | | |
|---|---|---|
| WO | WO2013/019795 | 2/2013 |
| WO | WO2013/081984 | 6/2013 |

(Continued)

*Primary Examiner* — Mohamed Barakat
(74) *Attorney, Agent, or Firm* — Gardner, Linn, Burkhart & Flory, LLP

(57) ABSTRACT

A vehicle mirror and camera mounting system includes a windshield attachment member configured to adhesively attach at a vehicle windshield and a camera mounting bracket configured to attach at the windshield attachment member. The camera mounting bracket is an injection molded bracket that is formed by injection molding a thermoplastic reinforced polyamide polymeric molding resin. With the windshield attachment member adhesively attached at the in-cabin surface of the windshield, the camera mounting bracket, with a camera module attached thereat, is attached at the windshield attachment member. The camera mounting bracket includes a mirror attachment portion for attaching an interior rearview mirror assembly. The mirror mount includes an attaching portion that is configured to insert at least partially into a socket of the mirror attachment portion of the camera mounting bracket to attach the interior rearview mirror assembly at the camera mounting bracket.

14 Claims, 37 Drawing Sheets

(51) Int. Cl.
B60S 1/08 (2006.01)
B60R 22/44 (2006.01)

(56) References Cited

U.S. PATENT DOCUMENTS

| | | | |
|---|---|---|---|
| 5,949,331 | A | 9/1999 | Schofield et al. |
| 6,087,953 | A | 7/2000 | DeLine et al. |
| 6,097,023 | A | 8/2000 | Schofield et al. |
| 6,124,886 | A | 9/2000 | DeLine et al. |
| 6,172,613 | B1 | 1/2001 | DeLine et al. |
| 6,243,003 | B1 | 6/2001 | DeLine et al. |
| 6,250,148 | B1 | 6/2001 | Lynam |
| 6,278,377 | B1 | 8/2001 | DeLine et al. |
| 6,326,613 | B1 | 12/2001 | Heslin et al. |
| 6,329,925 | B1 | 12/2001 | Skiver et al. |
| 6,341,523 | B2 | 1/2002 | Lynam |
| 6,420,975 | B1 | 7/2002 | DeLine et al. |
| 6,428,172 | B1 | 8/2002 | Hutzel et al. |
| 6,445,287 | B1 | 9/2002 | Schofield et al. |
| 6,501,387 | B2 | 12/2002 | Skiver et al. |
| 6,593,565 | B2 | 7/2003 | Heslin et al. |
| 6,690,268 | B2 | 2/2004 | Schofield et al. |
| 6,774,356 | B2 * | 8/2004 | Heslin .................. B60R 1/04 250/214 AL |
| 6,824,281 | B2 | 11/2004 | Schofield et al. |
| 6,968,736 | B2 | 11/2005 | Lynam |
| 7,004,593 | B2 | 2/2006 | Weller et al. |
| 7,262,406 | B2 | 8/2007 | Heslin et al. |
| 7,265,342 | B2 | 9/2007 | Heslin et al. |
| 7,289,037 | B2 | 10/2007 | Uken et al. |
| 7,344,261 | B2 | 3/2008 | Schofield et al. |
| 7,420,159 | B2 | 9/2008 | Heslin et al. |
| 7,423,248 | B2 | 9/2008 | Schofield et al. |
| 7,480,149 | B2 * | 1/2009 | DeWard ................. B60R 11/04 340/438 |
| 7,538,316 | B2 | 5/2009 | Heslin et al. |
| 7,916,009 | B2 | 3/2011 | Schofield et al. |
| 7,946,505 | B2 | 5/2011 | Lynam et al. |
| 7,994,462 | B2 | 8/2011 | Schofield et al. |
| 8,179,437 | B2 | 5/2012 | Schofield et al. |
| 8,203,440 | B2 | 6/2012 | Schofield et al. |
| 8,222,588 | B2 | 7/2012 | Schofield et al. |
| 8,239,086 | B2 | 8/2012 | Higgins-Luthman |
| 8,256,821 | B2 * | 9/2012 | Lawlor .................... B60R 1/12 296/37.8 |
| 8,289,142 | B2 | 10/2012 | Pawlicki et al. |
| 8,314,689 | B2 | 11/2012 | Schofield et al. |
| 8,324,552 | B2 | 12/2012 | Schofield et al. |
| 8,405,726 | B2 | 3/2013 | Schofield et al. |
| 8,451,332 | B2 | 5/2013 | Rawlings |
| 8,534,887 | B2 * | 9/2013 | DeLine .................. 340/815.4 |
| 8,743,203 | B2 * | 6/2014 | Karner ............... B29C 45/0017 340/461 |
| 8,851,690 | B2 * | 10/2014 | Uken .......................... 359/875 |
| 8,944,655 | B2 * | 2/2015 | Verrat-Debailleul B32B 17/10036 362/545 |
| 9,150,165 | B1 * | 10/2015 | Fortin .................. B60R 13/005 |
| 9,156,403 | B2 * | 10/2015 | Rawlings ................. B60R 1/04 |
| 2006/0050018 | A1 | 3/2006 | Hutzel et al. |
| 2009/0295181 | A1 | 12/2009 | Lawlor et al. |
| 2014/0226012 | A1 | 8/2014 | Achenbach et al. |

FOREIGN PATENT DOCUMENTS

| | | |
|---|---|---|
| WO | WO2013/081985 | 6/2013 |
| WO | WO2013/123161 | 8/2013 |

* cited by examiner

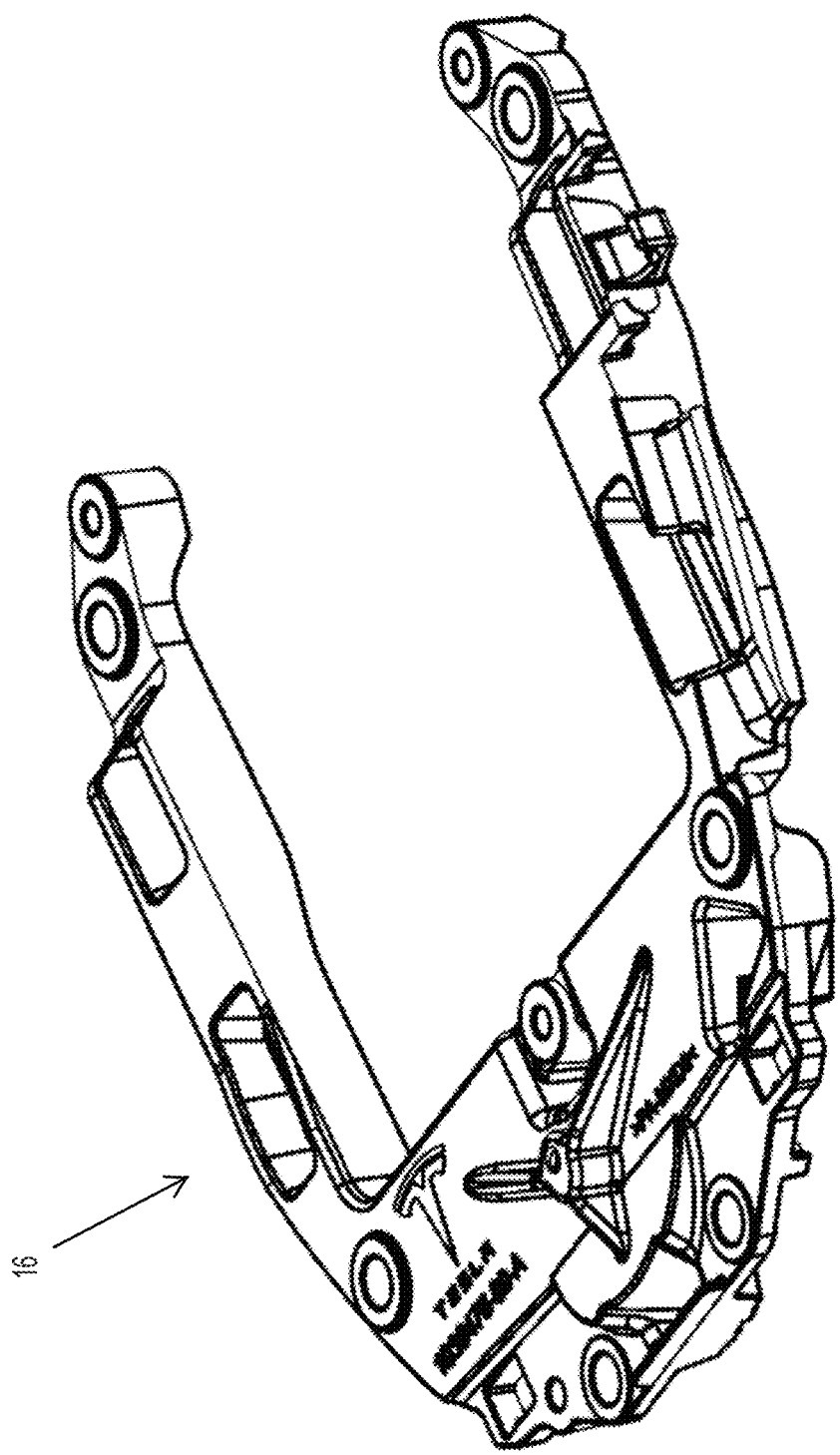

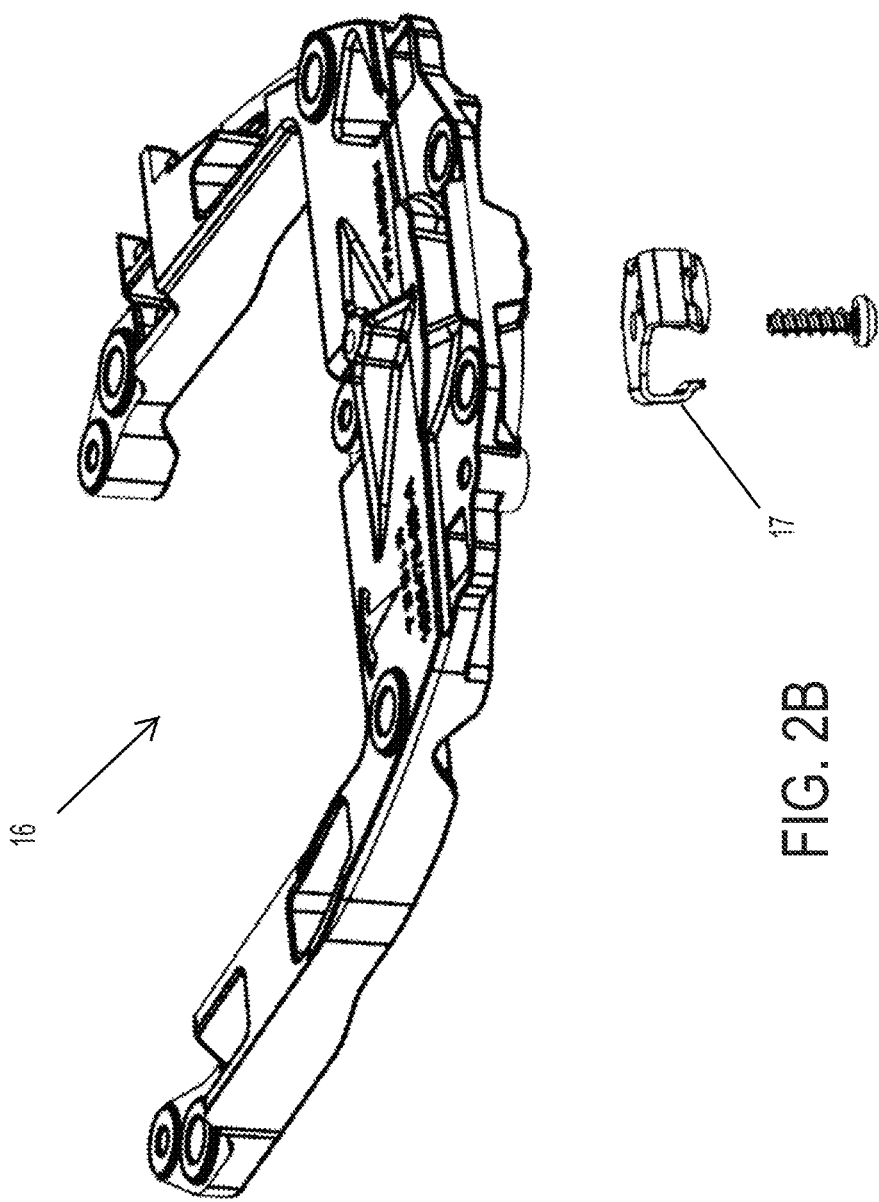

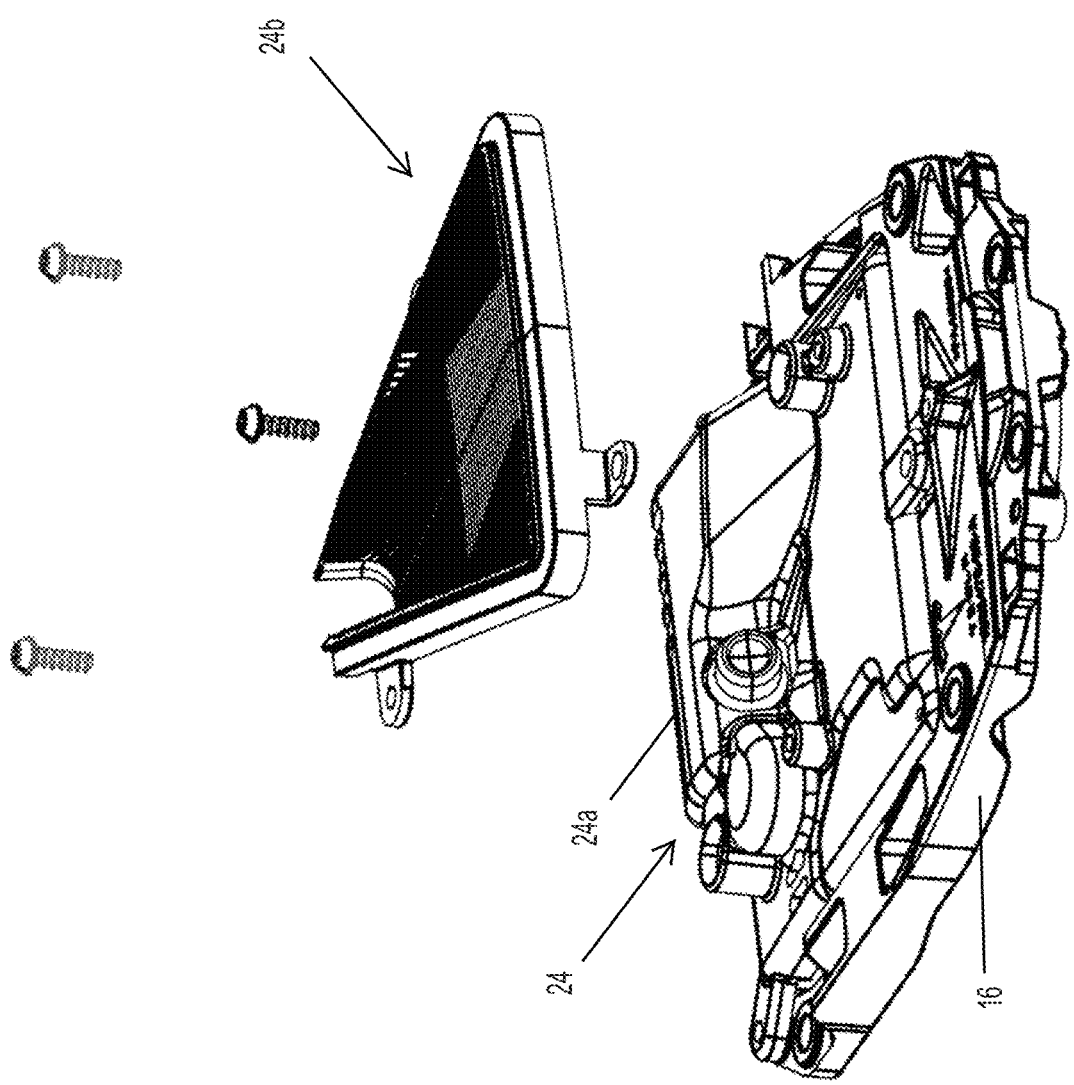

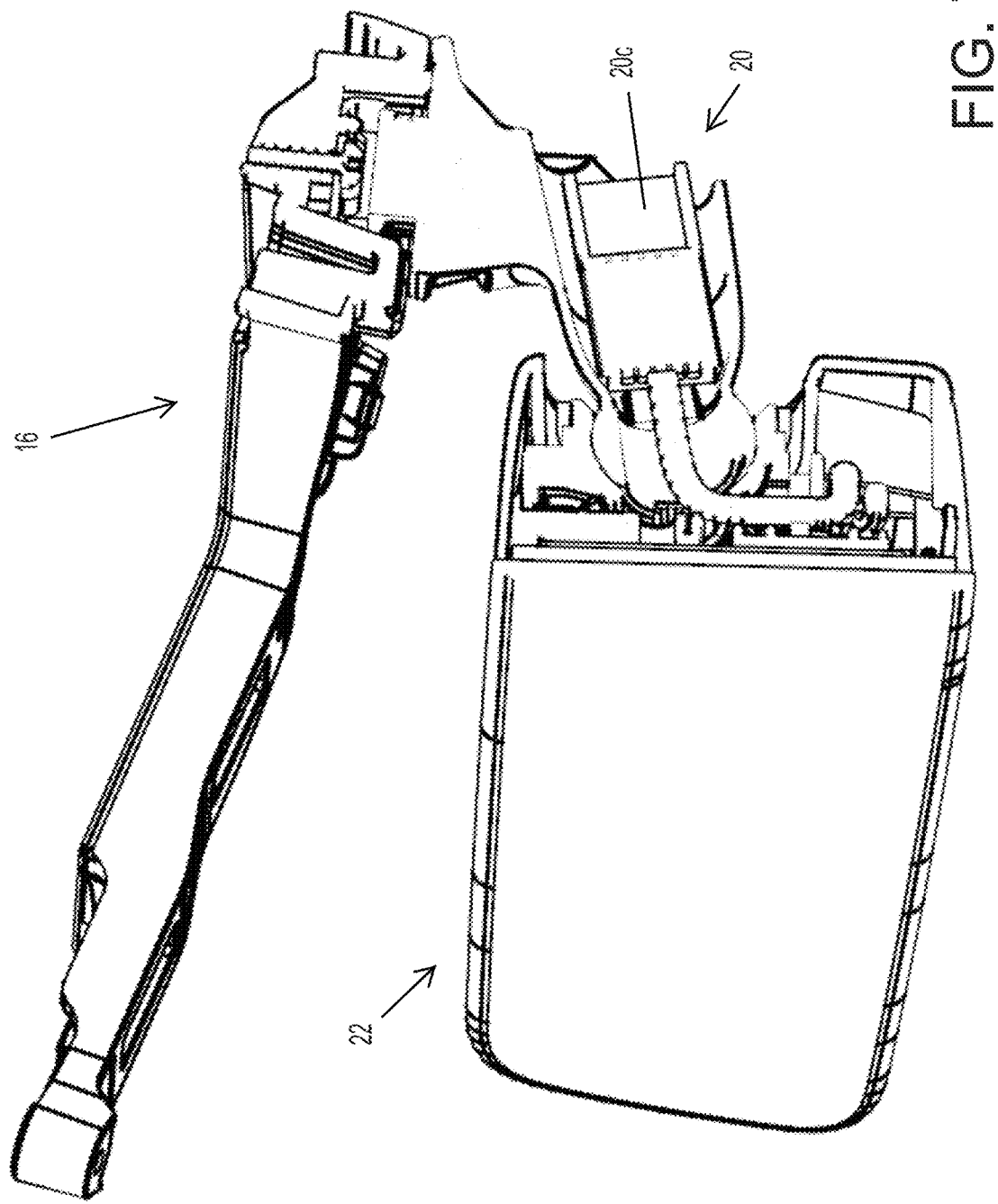

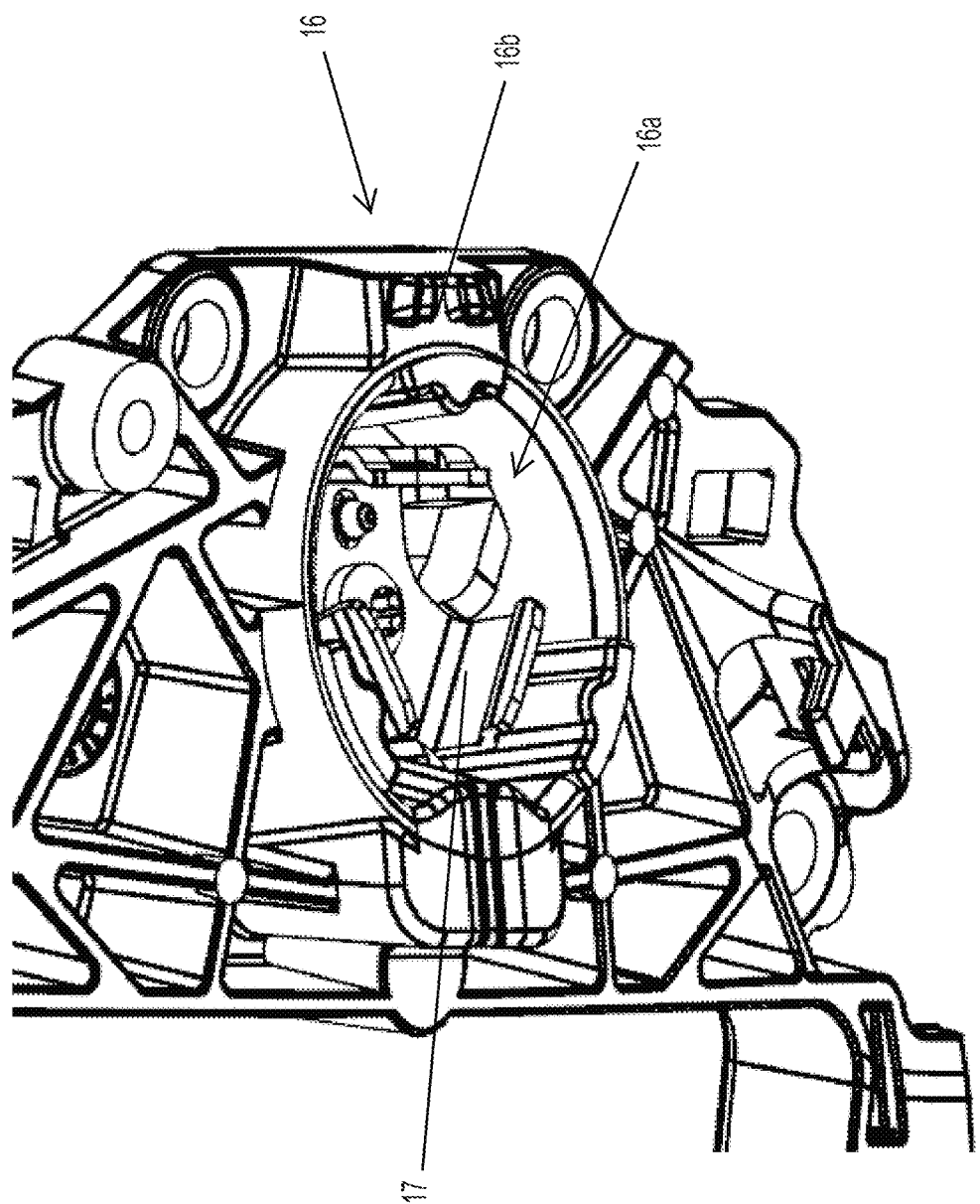

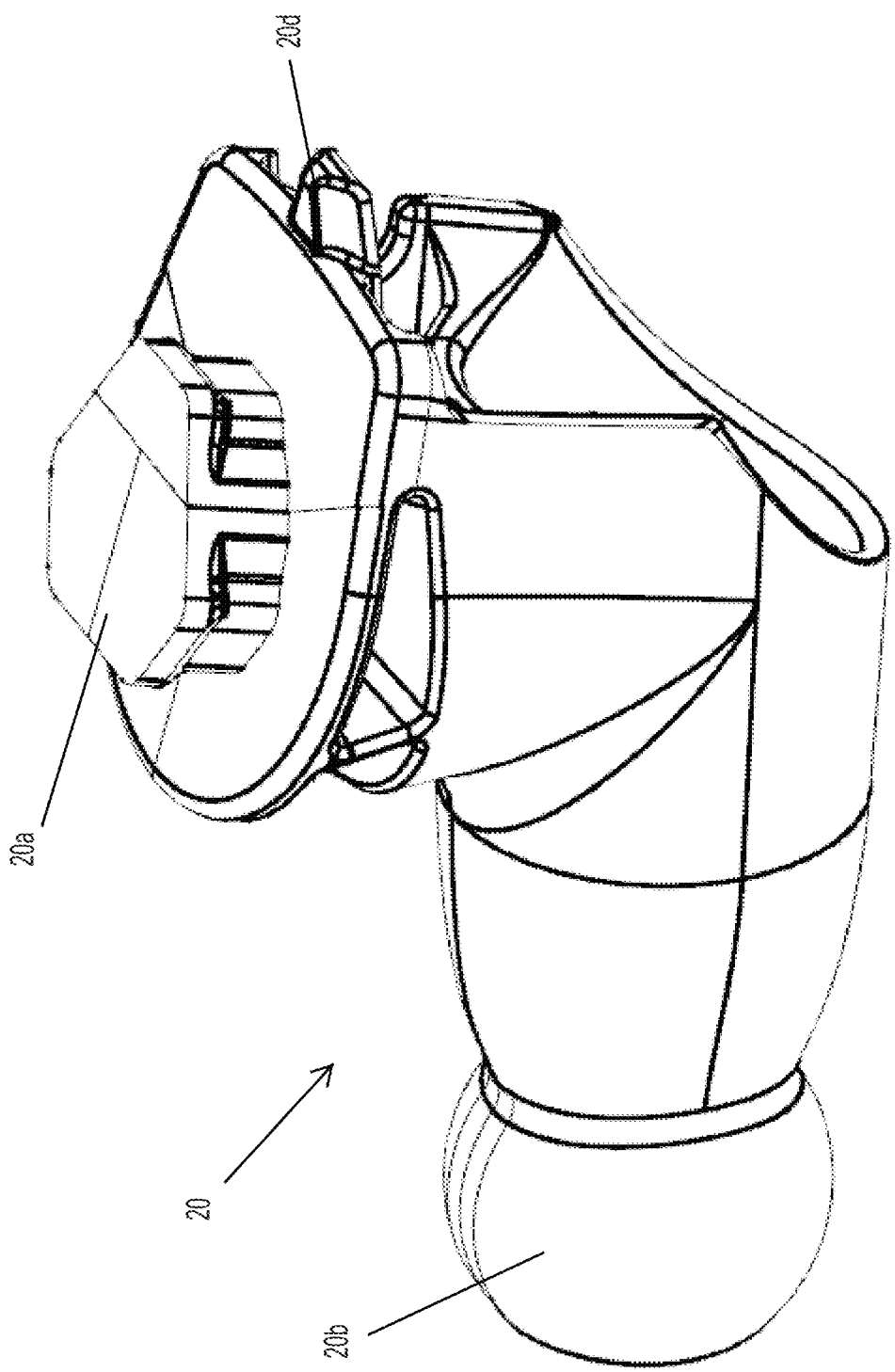

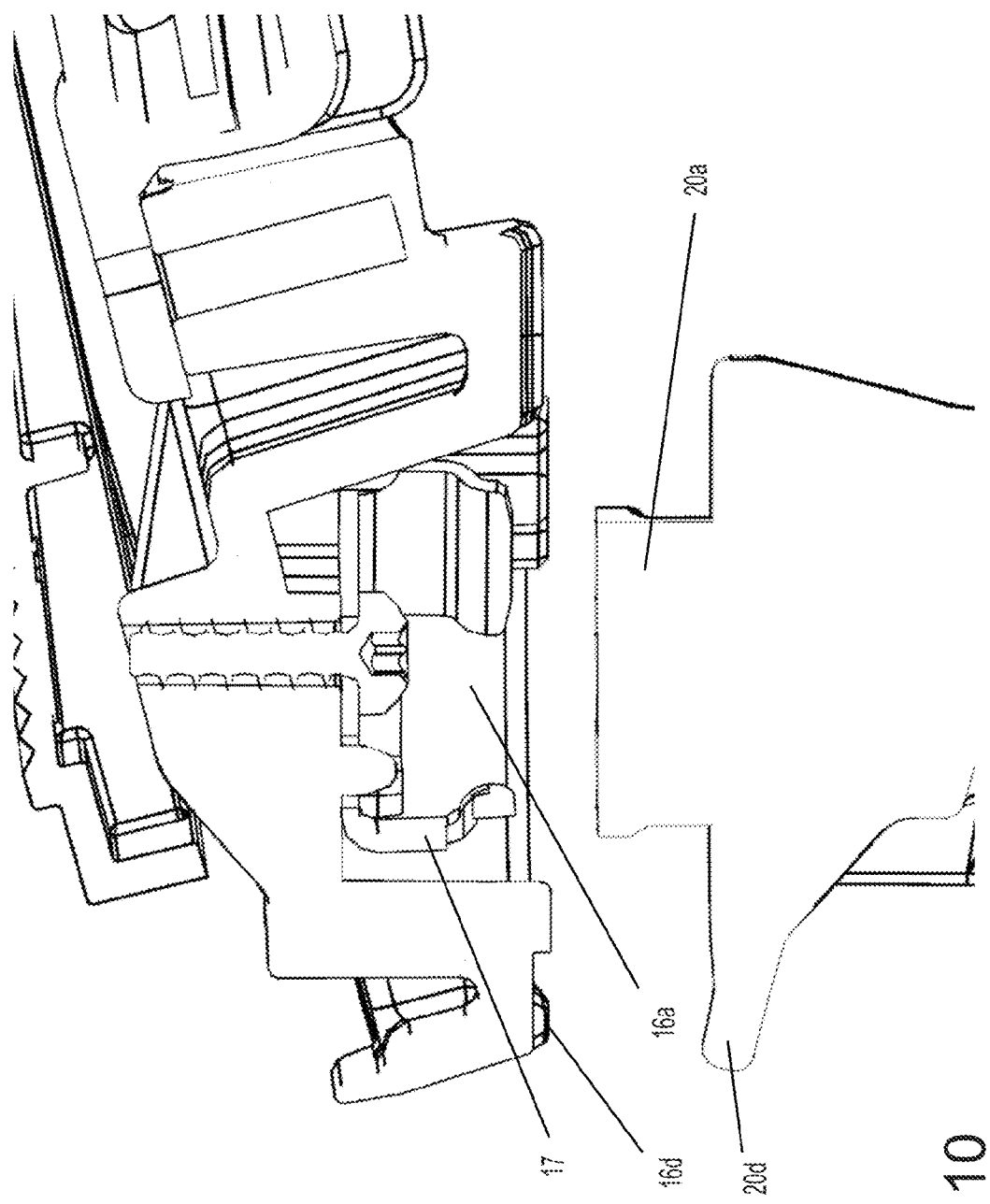

VEHICLE VISION SYSTEM WITH CAMERA AND MIRROR MOUNT

CROSS REFERENCE TO RELATED APPLICATIONS

The present application claims the filing benefits of U.S. provisional applications, Ser. 61/973,923, filed Apr. 2, 2014 and Ser. No. 61/950,262, filed Mar. 10, 2014, which are hereby incorporated herein by reference in their entireties.

FIELD OF THE INVENTION

The present invention relates to mirror assemblies and front camera modules for vehicles and, more particularly, to mounting of mirror assemblies and front camera modules at windshields of vehicles.

BACKGROUND OF THE INVENTION

Use of imaging sensors in vehicle imaging systems, such as for machine vision applications in vehicles, is common and known. Packaging of forward facing imagers is also known, such as described in U.S. Pat. Nos. 7,262,406; 7,265,342; 7,420,159; 7,480,149; 7,533,998; 7,538,316; 7,916,009; 8,179,437 and/or 8,405,726, which are hereby incorporated herein by reference in their entireties. Examples of known vision systems are described in U.S. Pat. Nos. 8,324,552; 8,314,689; 8,289,142; 8,222,588; 8,239,086; 8,203,440; 7,994,462; 7,655,894; 7,339,149; 7,344,261; 7,459,664; 7,423,248; 6,097,023; 5,949,331; 5,670,935 and/or 5,550,677, which are hereby incorporated herein by reference in their entireties.

SUMMARY OF THE INVENTION

The present invention provides an interior rearview mirror assembly and mounting arrangement that mounts the mirror assembly and a camera module at an in-cabin surface of a vehicle windshield. The camera module may provide a stray light shield for the forward facing imaging (FFI) machine vision camera module. The interior rearview mirror assembly and the camera module are configured to attach at the vehicle windshield at a camera mounting bracket attached at a windshield attachment member that may be attached or adhered at the in-cabin surface of the vehicle windshield. The camera mounting bracket includes a socket or receiving portion that receives an attachment portion or element of a mirror mount at least partially therein to attach the mirror mount and the mirror assembly at the camera mounting bracket. The mirror mount may attach at the camera mounting bracket via a twist-lock attachment. A rain sensor may also attach at the bracket, such as when the bracket is attached at the vehicle windshield.

These and other objects, advantages, purposes and features of the present invention will become apparent upon review of the following specification in conjunction with the drawings.

BRIEF DESCRIPTION OF THE DRAWINGS

FIGS. 2A-E and 3A-B are perspective views of the components and assemblies of the mounting system of the present invention;

FIG. 7 is a sectional view of the mirror assembly and camera mounting bracket of FIG. 6;

FIGS. 8A-B are perspective views showing the camera mounting bracket and receiving portion for receiving the mirror mount of the mirror assembly;

FIG. 9 is a perspective view of the mirror mount showing the tri-lobe construction;

FIGS. 10 and 11 are perspective views showing the attachment of the mirror mount to the camera mounting bracket in accordance with the present invention;

DESCRIPTION OF THE PREFERRED EMBODIMENTS

Figure 1:
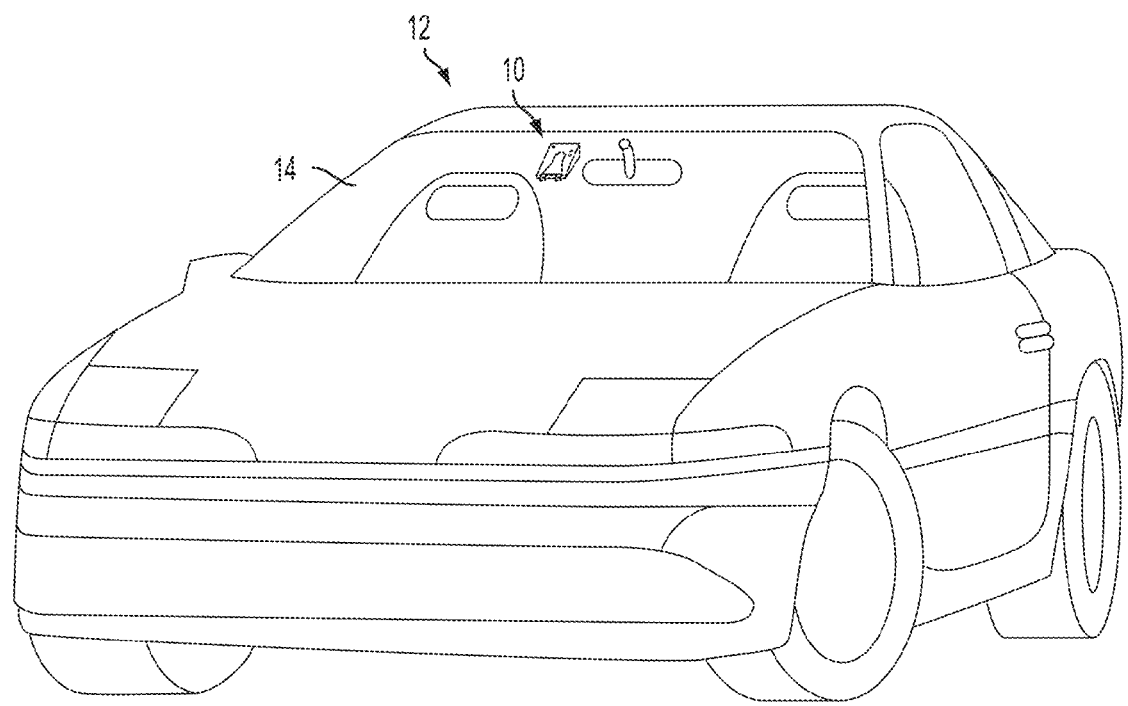
FIG. 1 is a perspective view of a vehicle having a vehicular camera and mirror mounting system in accordance with the present invention.
Figure 2C:
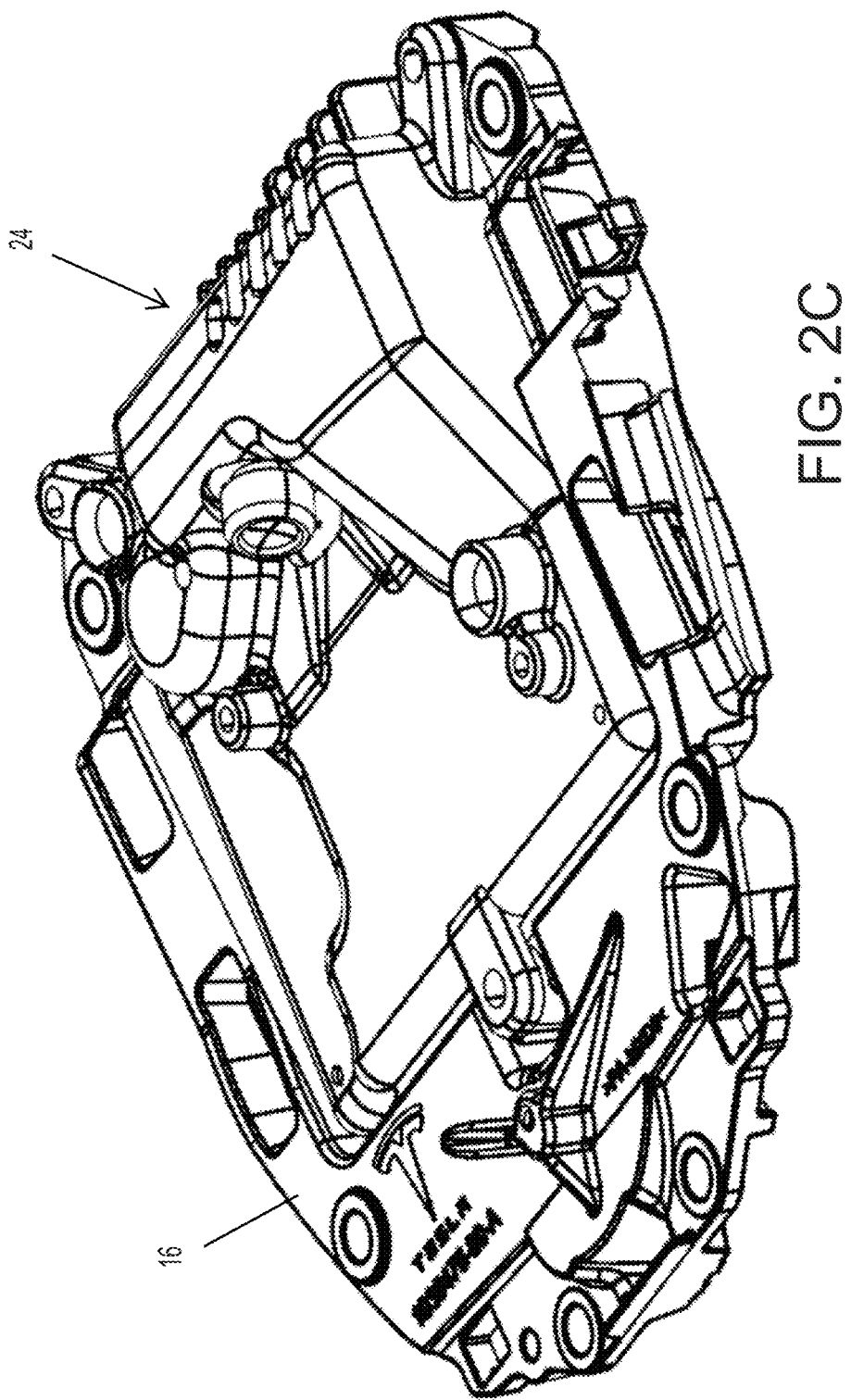
Figure 2E:
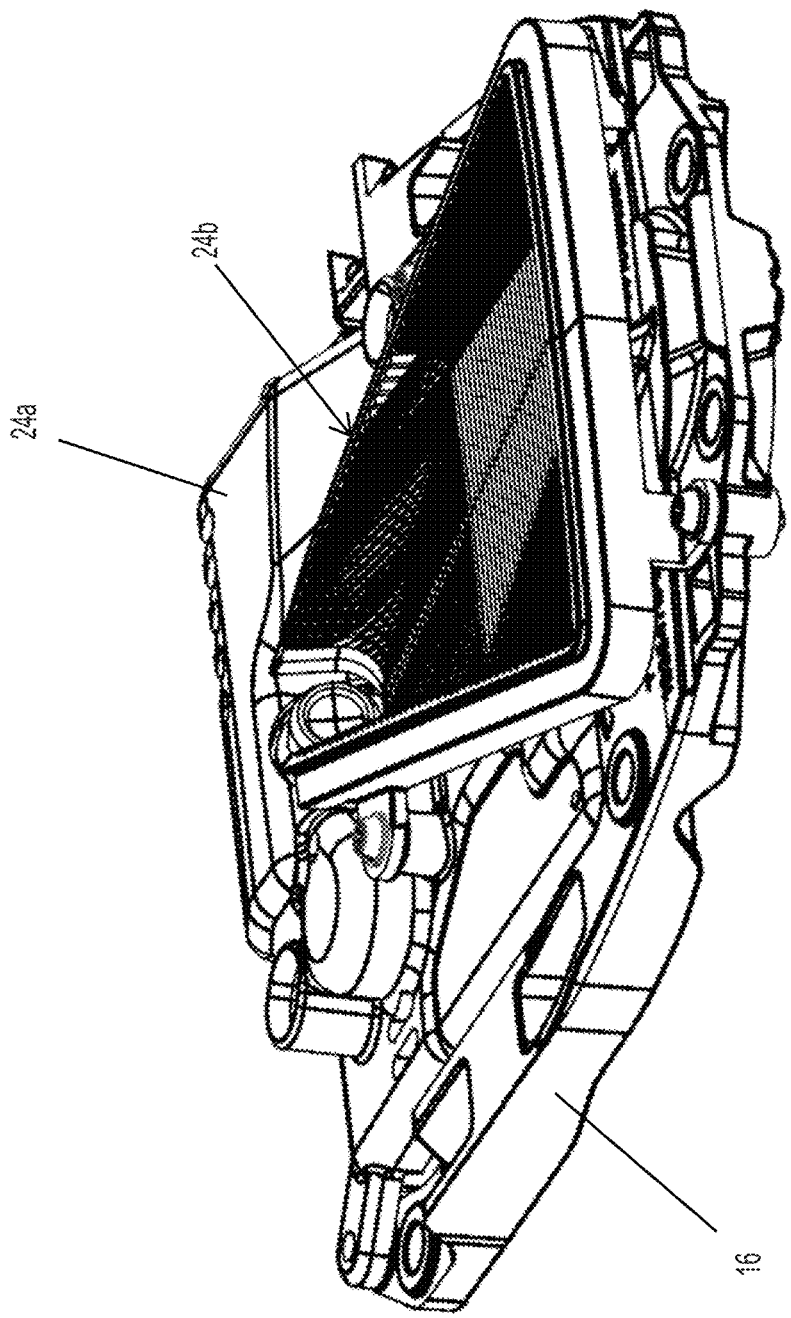

A vehicular camera system can be installed on the inside of the front windshield of a vehicle, such as a car, truck, bus, or van. Such a camera system may be used for a variety of functions such as object detection, lane keeping, and high beam control. FIG. 1 shows an example of a vehicular camera system or module 10 configured to be attached in a front-facing manner to a vehicle 12, such as at a windshield 14 of a vehicle 12. As shown in FIGS. 2C-E, 3A-B, 5C and 15-21, the camera module includes a housing and a lens barrel projecting therefrom. The camera module is attached at a camera mounting bracket 16, which attaches at a windshield attachment element 18 attached or adhered at an in-cabin surface of the windshield of the vehicle. As shown in FIGS. 2B and 7-11, the camera mounting bracket 16 includes a socket or receiving portion 16a that receives or attaches a mirror mount 20 of an interior rearview mirror assembly 22, such as via a twist-lock attachment, as discussed below.

Figure 8A:
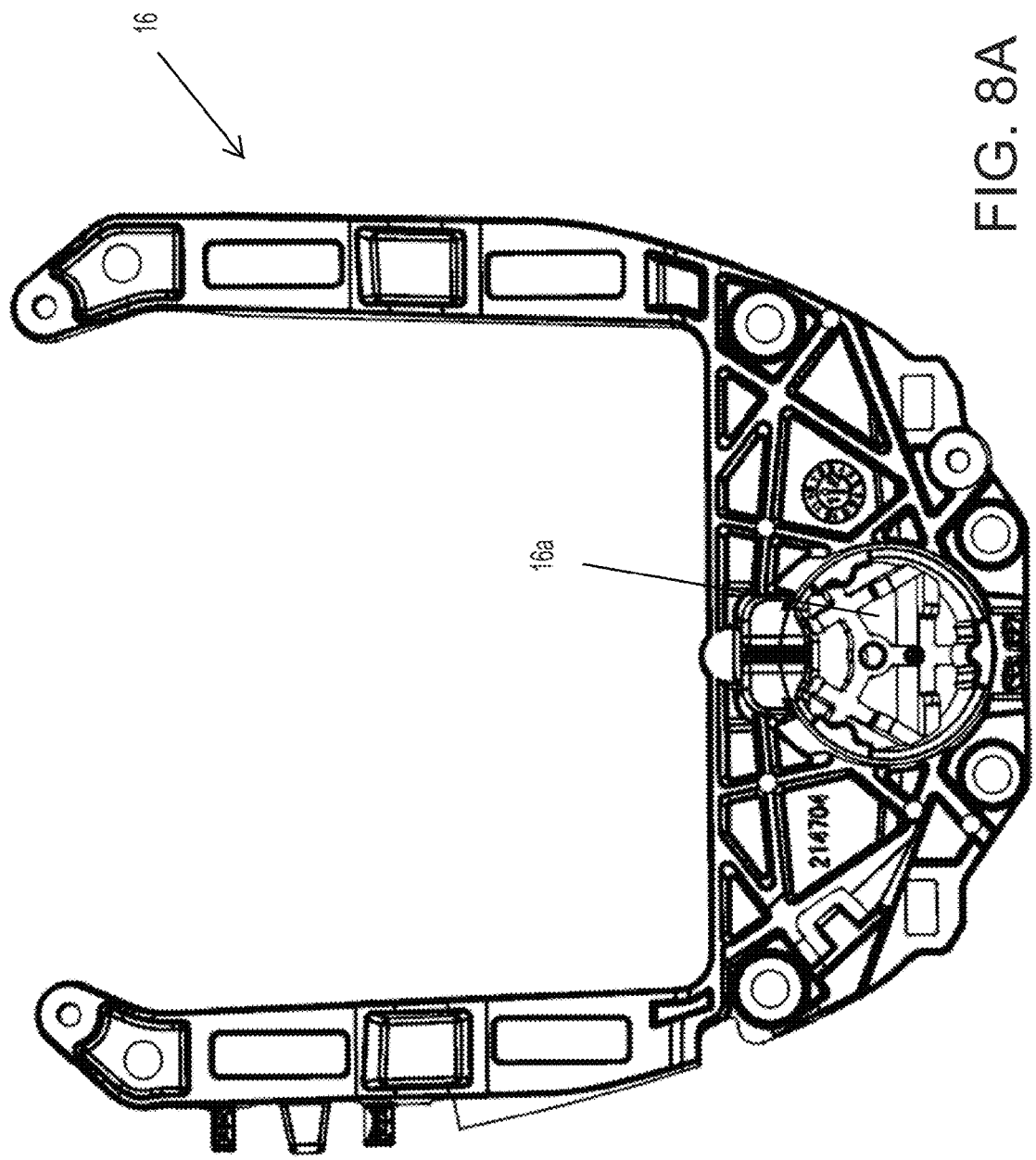
Figure 11:
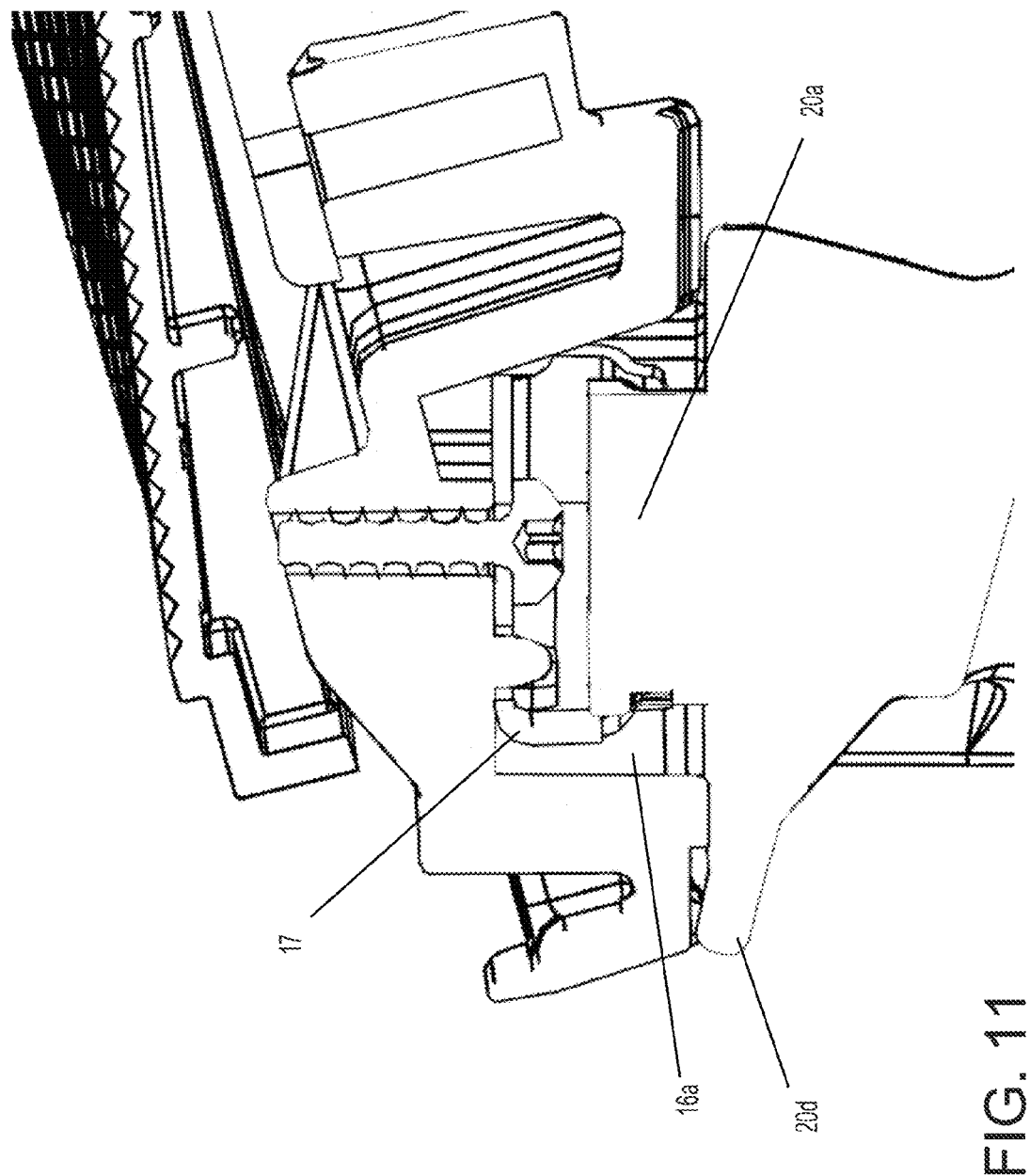
Figure 12:
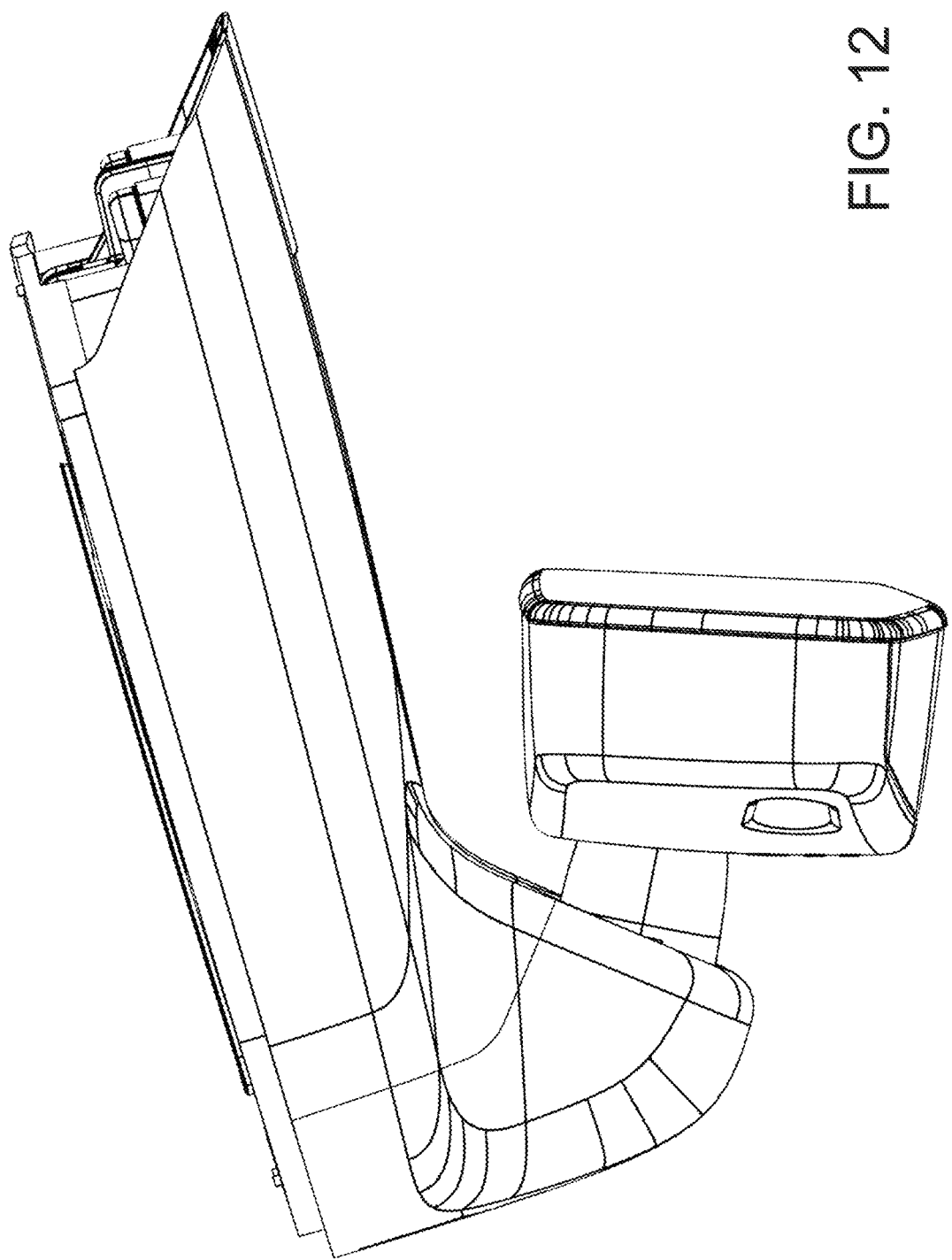
FIGS. 12-14 are side views and sectional views of the mirror and camera module and bracket and attachment member of the system of the present invention.
Figure 13:
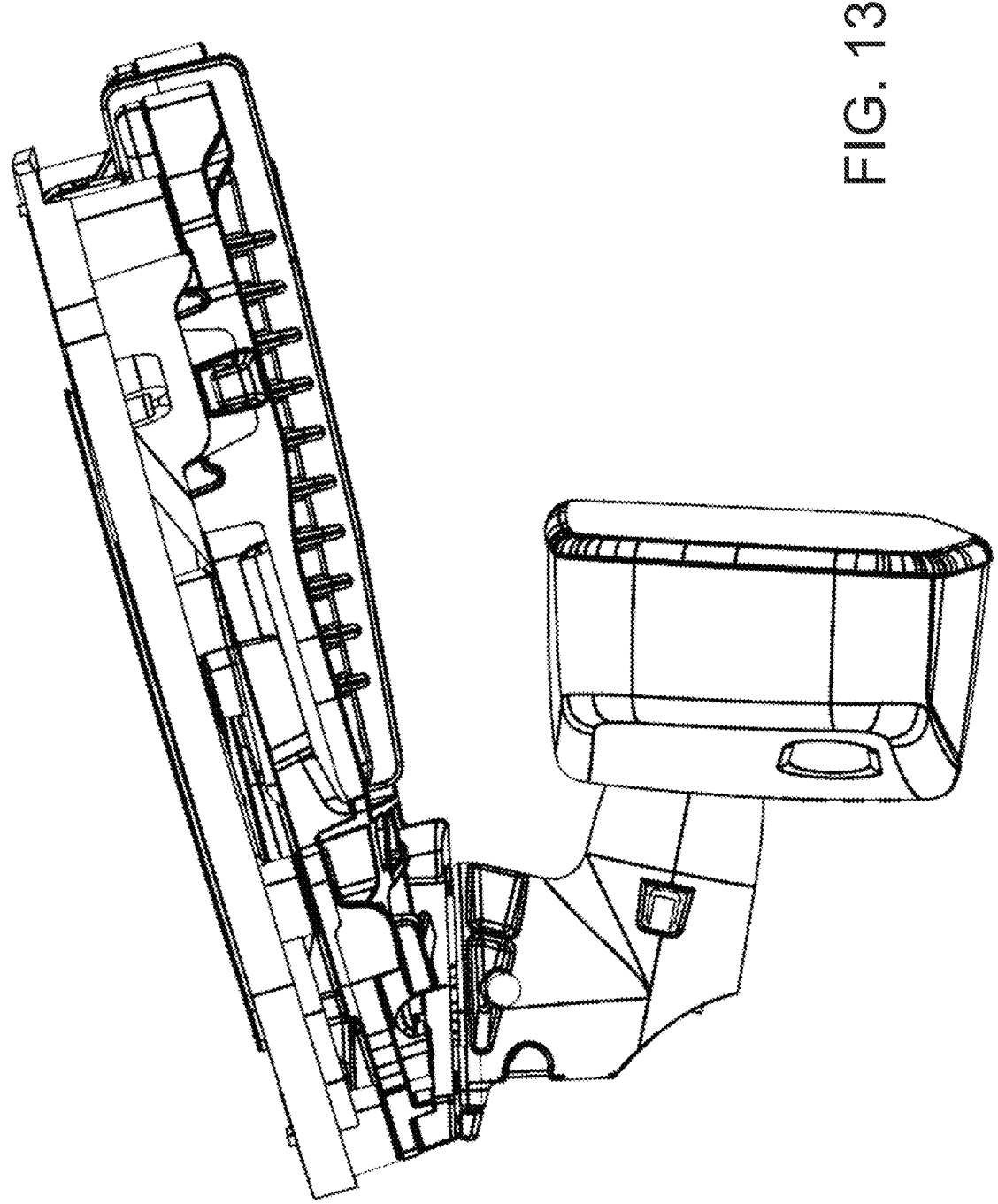

In the illustrated embodiment, and as best shown in FIGS. 2B, 8A and 8B, the receiving portion 16a of the camera mounting bracket 16 comprises a generally cylindrical recess having at least one and preferably three lobes protruding radially inward. The mirror mount 20 comprises a non-circular element 20a (as best shown in FIG. 9) that is received in the receiving portion of the camera mounting bracket. As can be seen with reference to FIGS. 2B, 8A-B and 9, a three pronged or tabbed spring element 17 is disposed in the receiving portion 16a (and attached thereto via a fastener, such as a screw or the like) so that, when the non-circular element 20*a* (such as a generally hexagonal-shaped element) of the mirror mount is inserted into the receiving portion, tabs of the non-circular element 20*a* are received in the receiving portion 16*a* between the tabs of the spring element 17, and then, when the mirror mount 20 is twisted or rotated relative to the camera mounting bracket 16 (such as about 60 degrees), the tabs of the non-circular element 20*a* engage and are aligned with and held by the tabs of the spring element 17 to attach the mirror mount 20 at the camera mounting bracket 16.

The spring element 17 is disposed in the receiving portion 16*a* such that the tabs of the spring element are at respective load bearing "feet" formed at the walls of the receiving portion to distribute the forces and stresses at the receiving portion of the camera mounting bracket. To reduce the system weight, the camera mounting bracket may comprises a structural plastic material, with the metallic spring element providing for enhanced wear. Because the mirror mount or stay comprises a metallic material for vibration stability, the wear features (such as undercuts that engage with the tri-lobe spring element or clip) are incorporated into the non-circular element 20*a* of the mirror mount.

Figure 14:
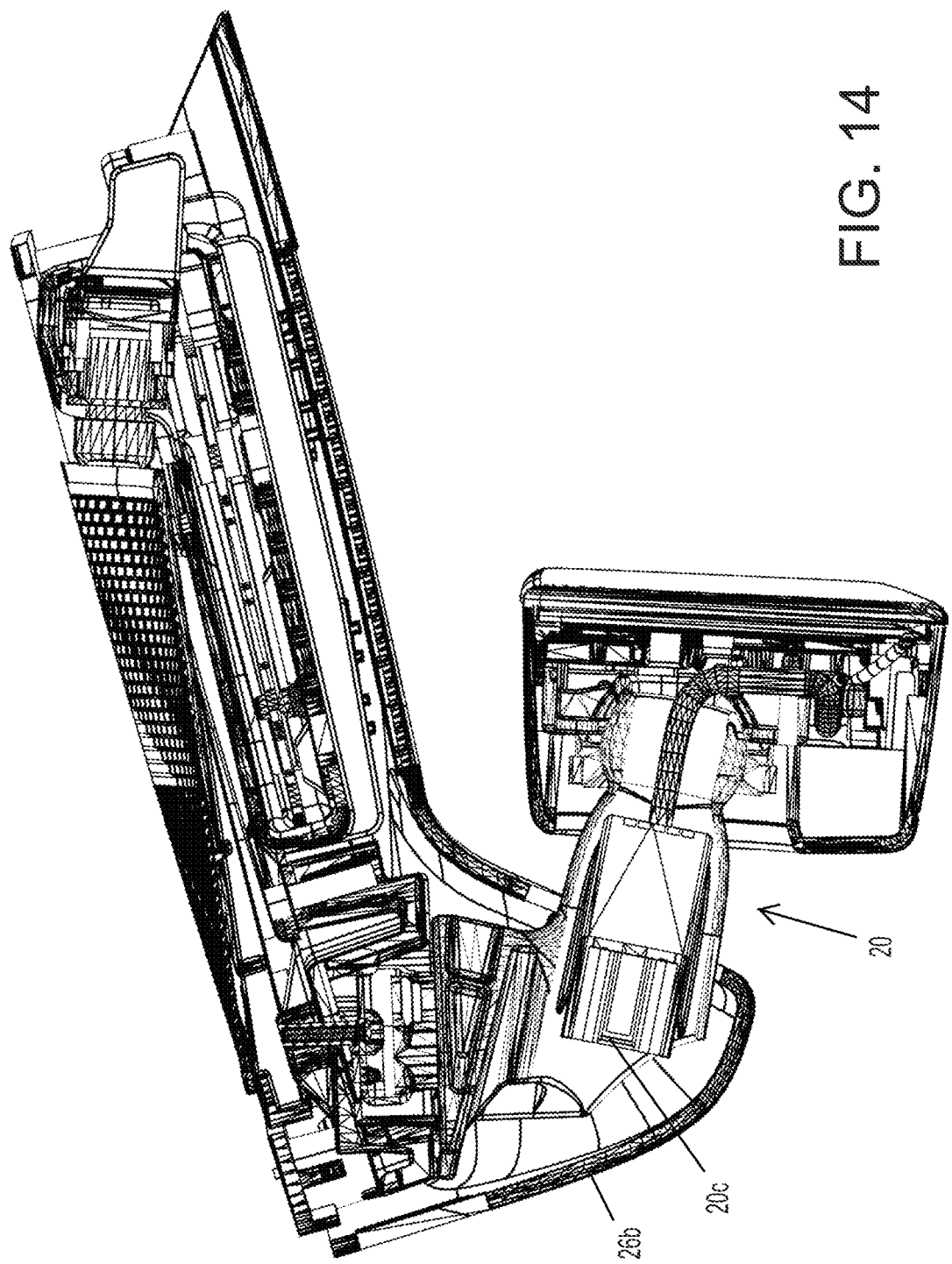
Figure 15:
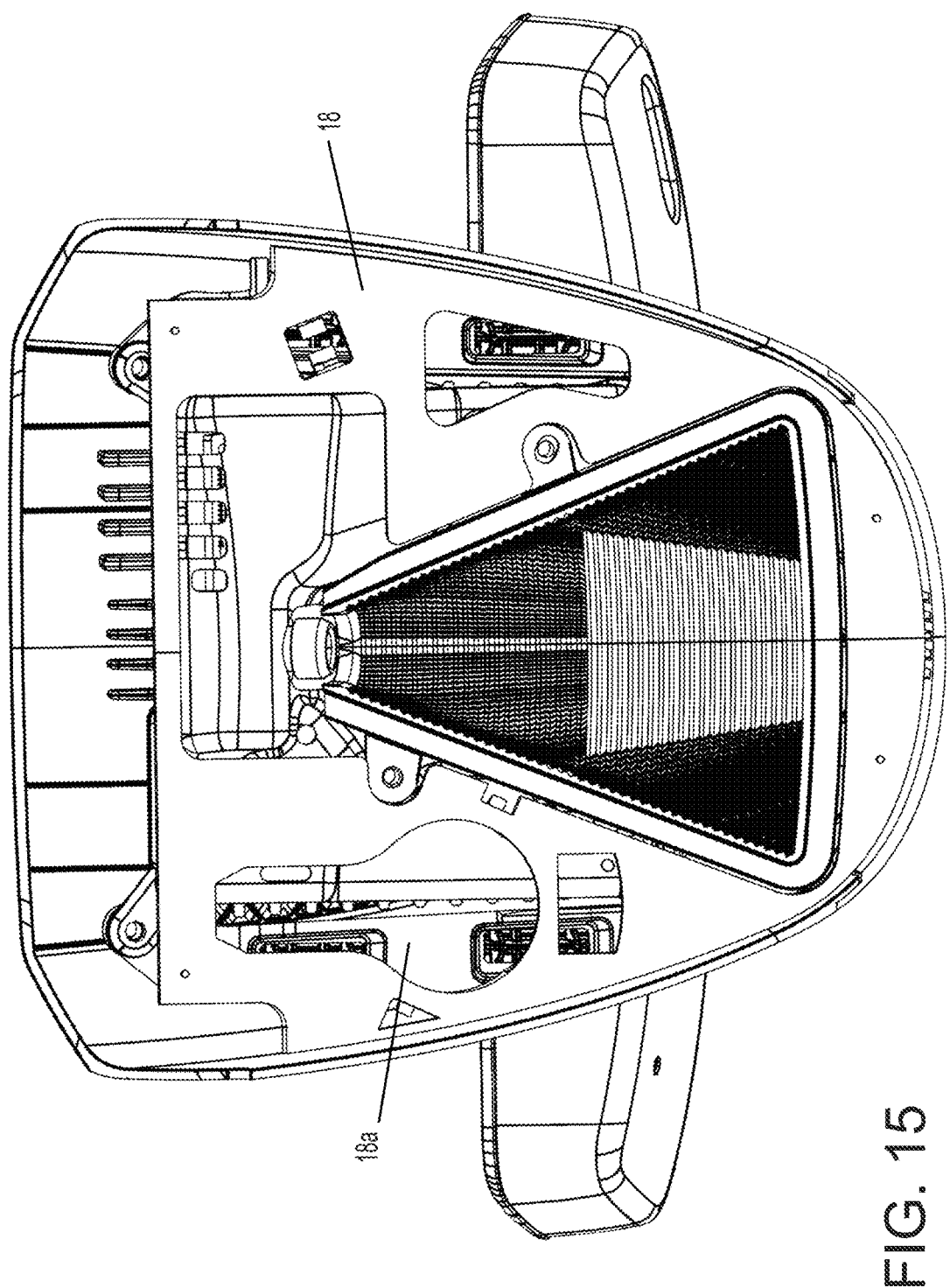
FIGS. 15-17 are views of the mounting system as would be viewed through the vehicle windshield, with portions removed from some of the Figures to show additional details.
Figure 16:
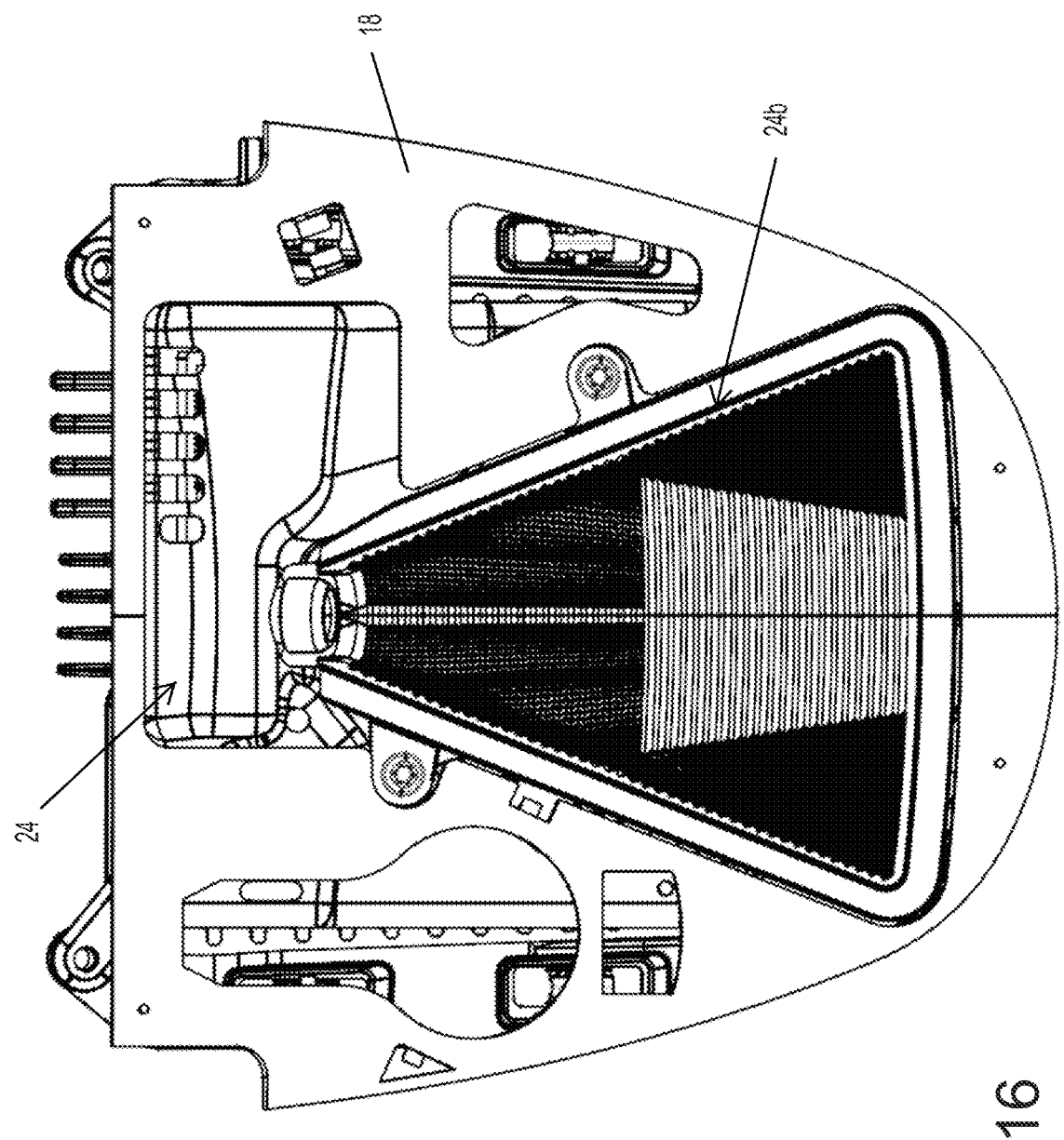
Figure 17:
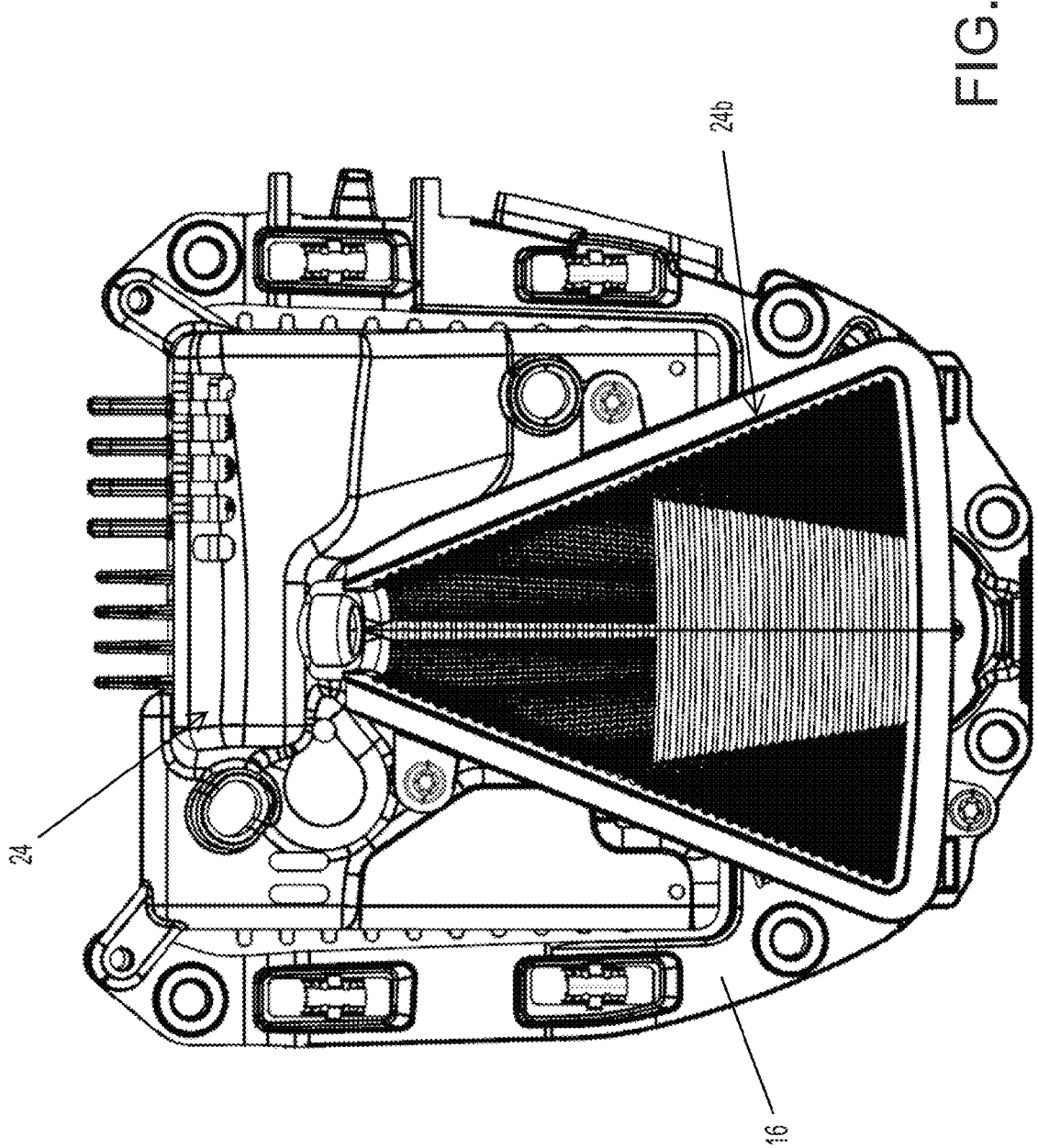
Figure 18:
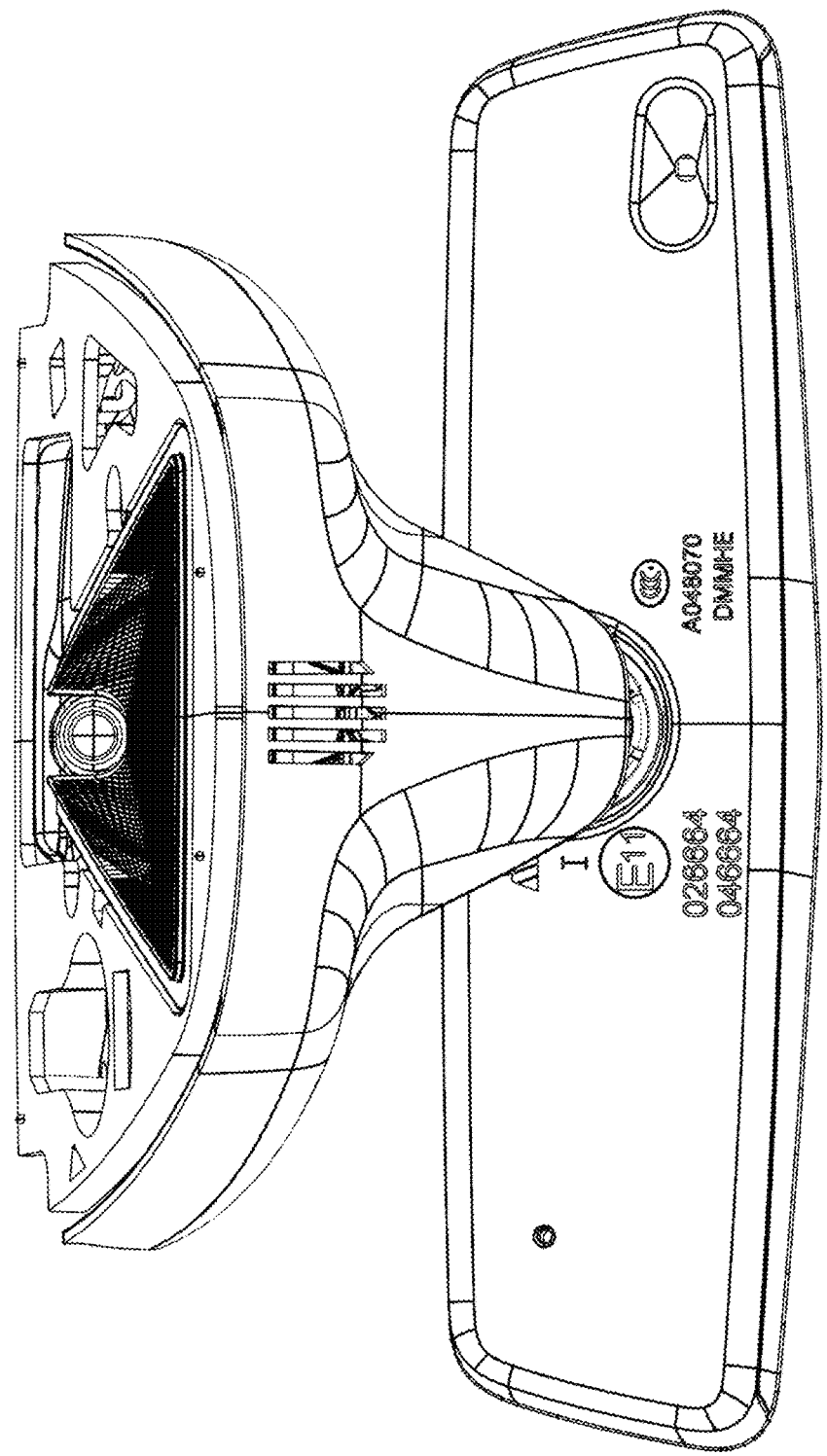
FIGS. 18-21 are views of the mounting system as would be viewed from the front of the vehicle, with portions removed from some of the Figures to show additional details.
Figure 19:
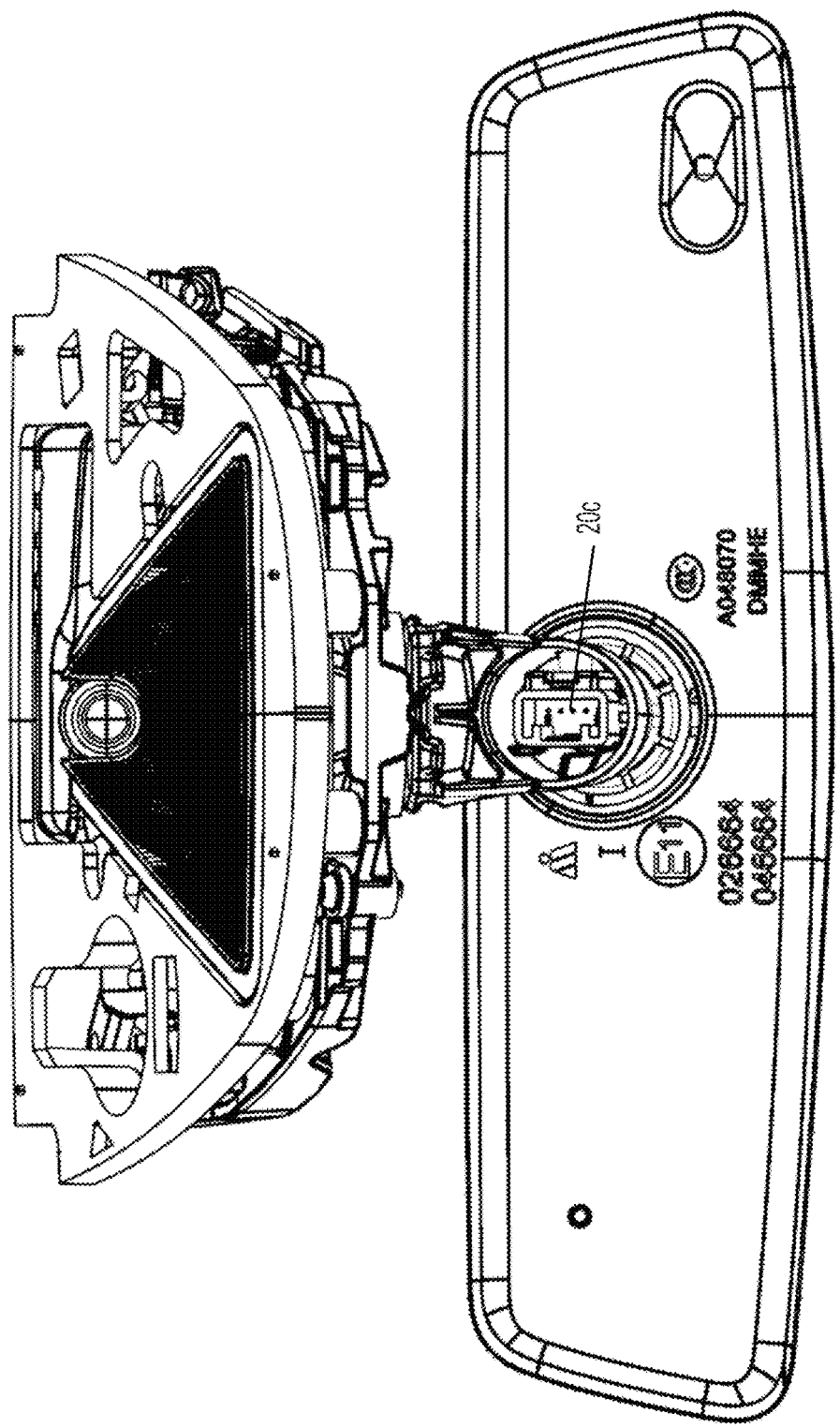
Figure 20:
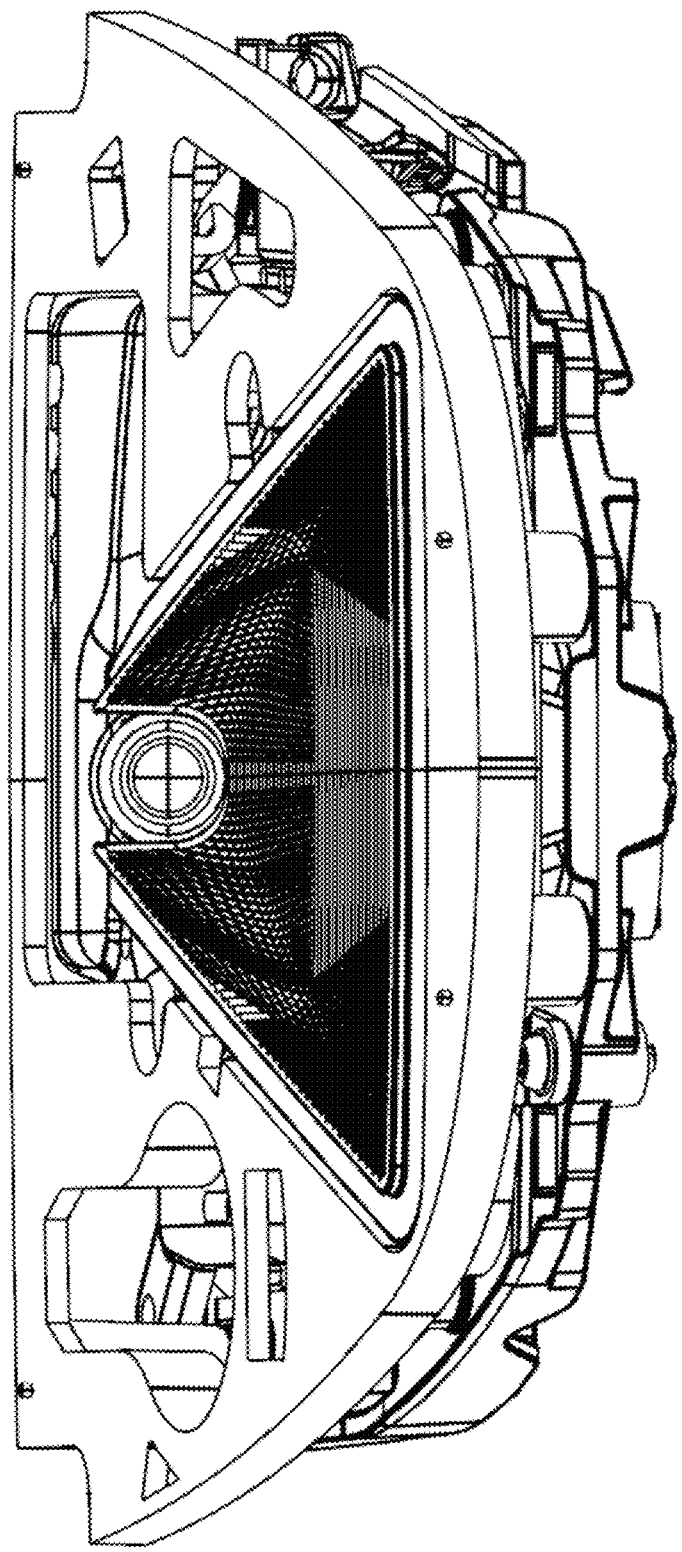
Figure 21:
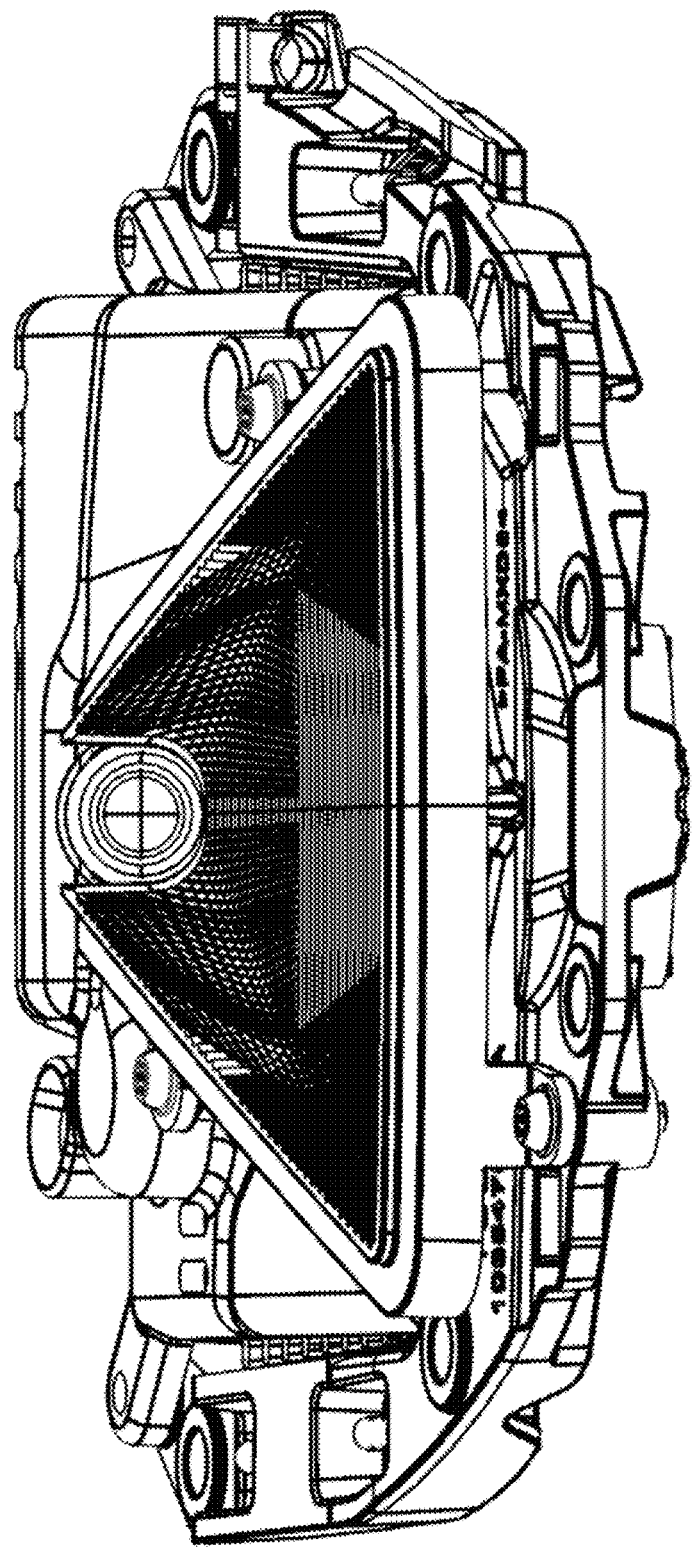
Figure 22:
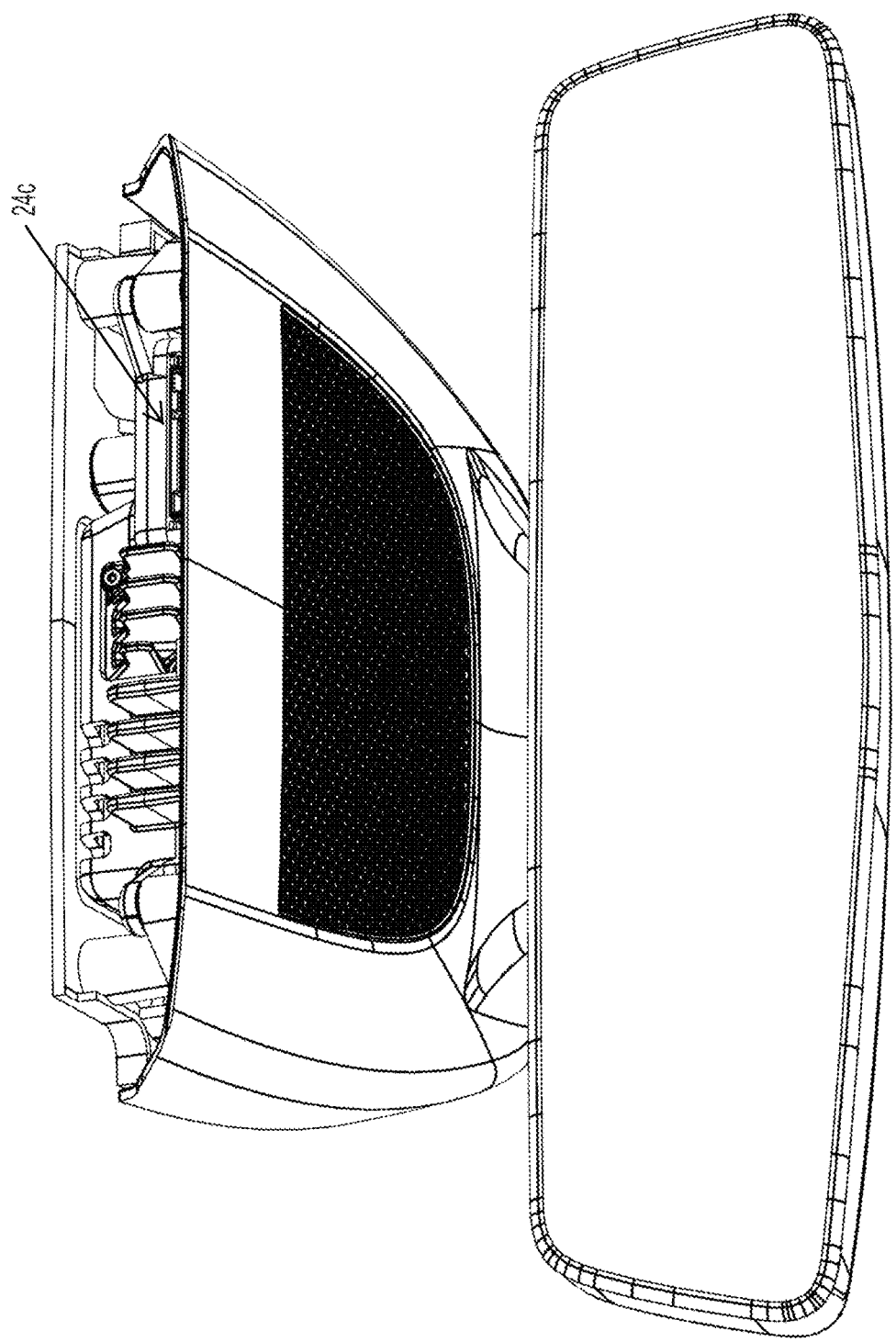
FIGS. 22-26 are perspective views of the mounting system, with portions removed from some of the Figures to show additional details.
Figure 23:
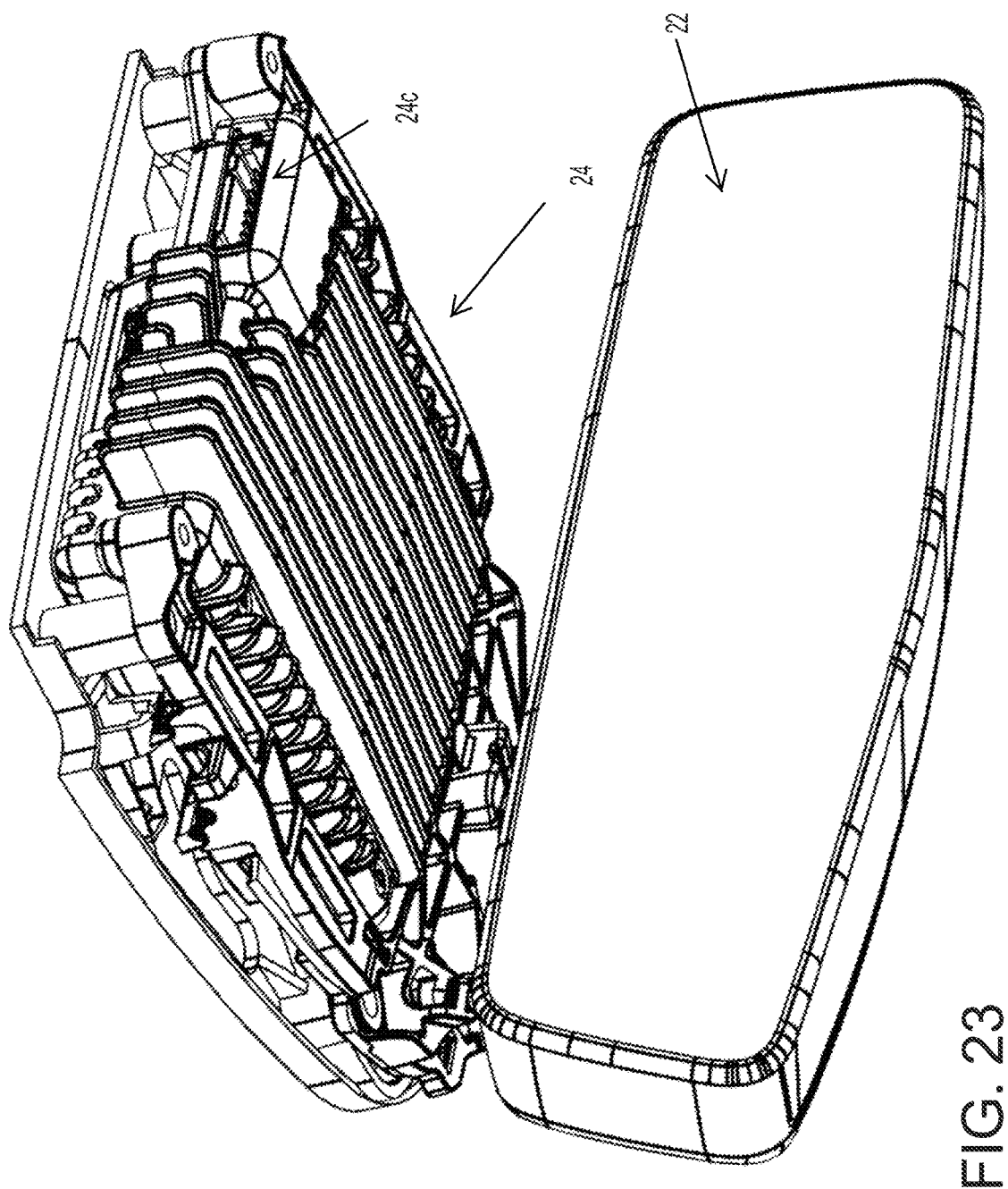
Figure 24:
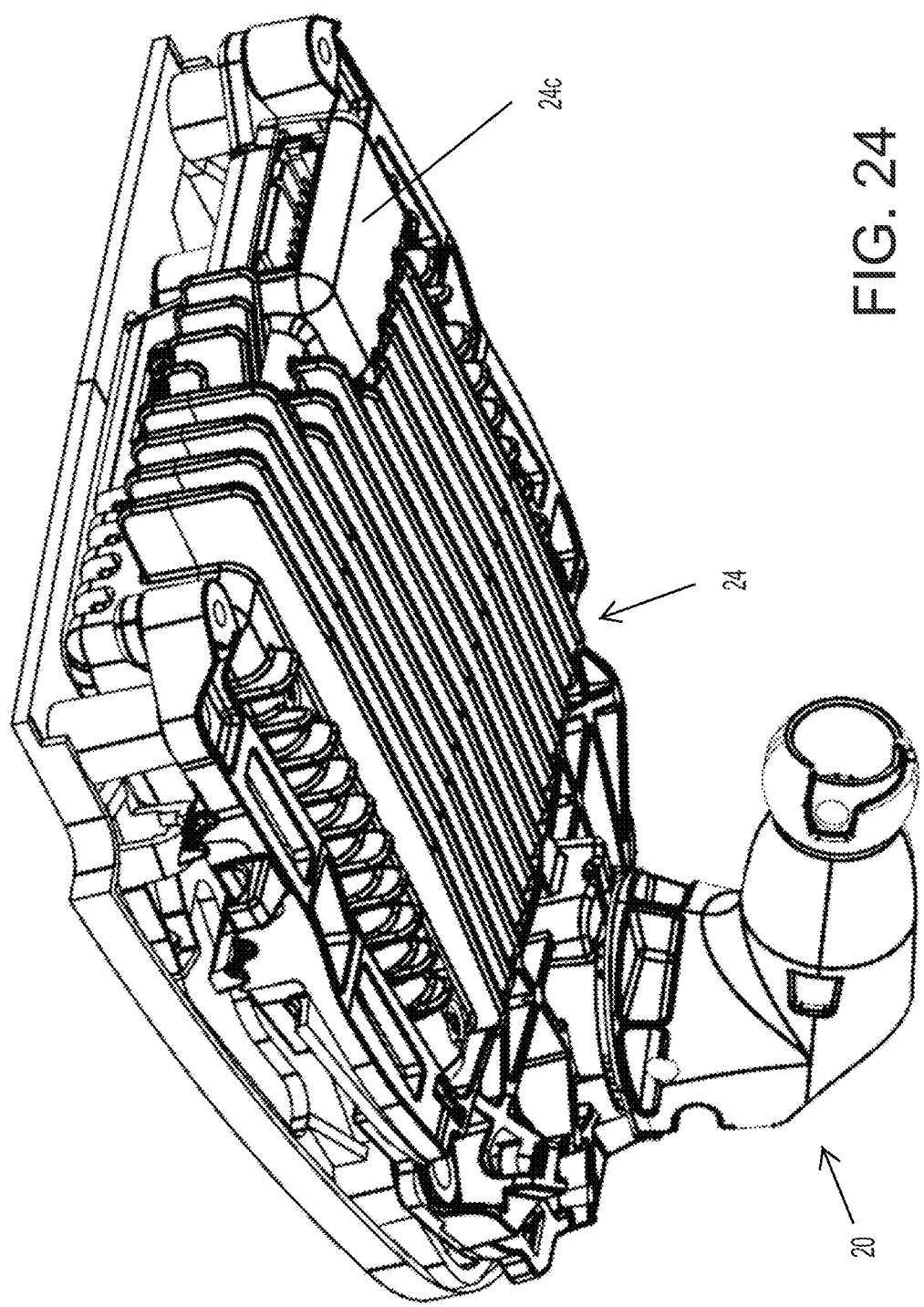
Figure 25:
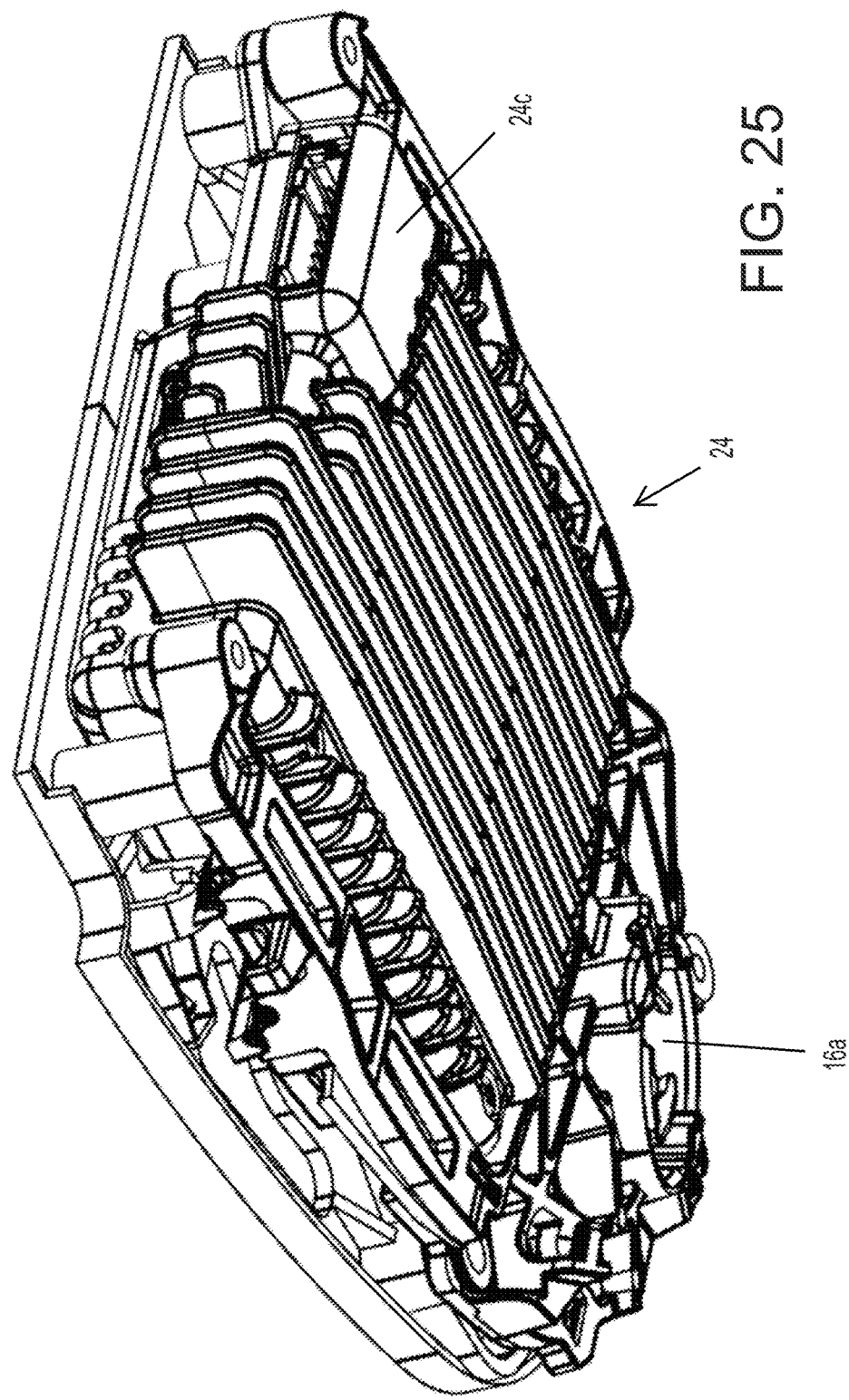
Figure 26:
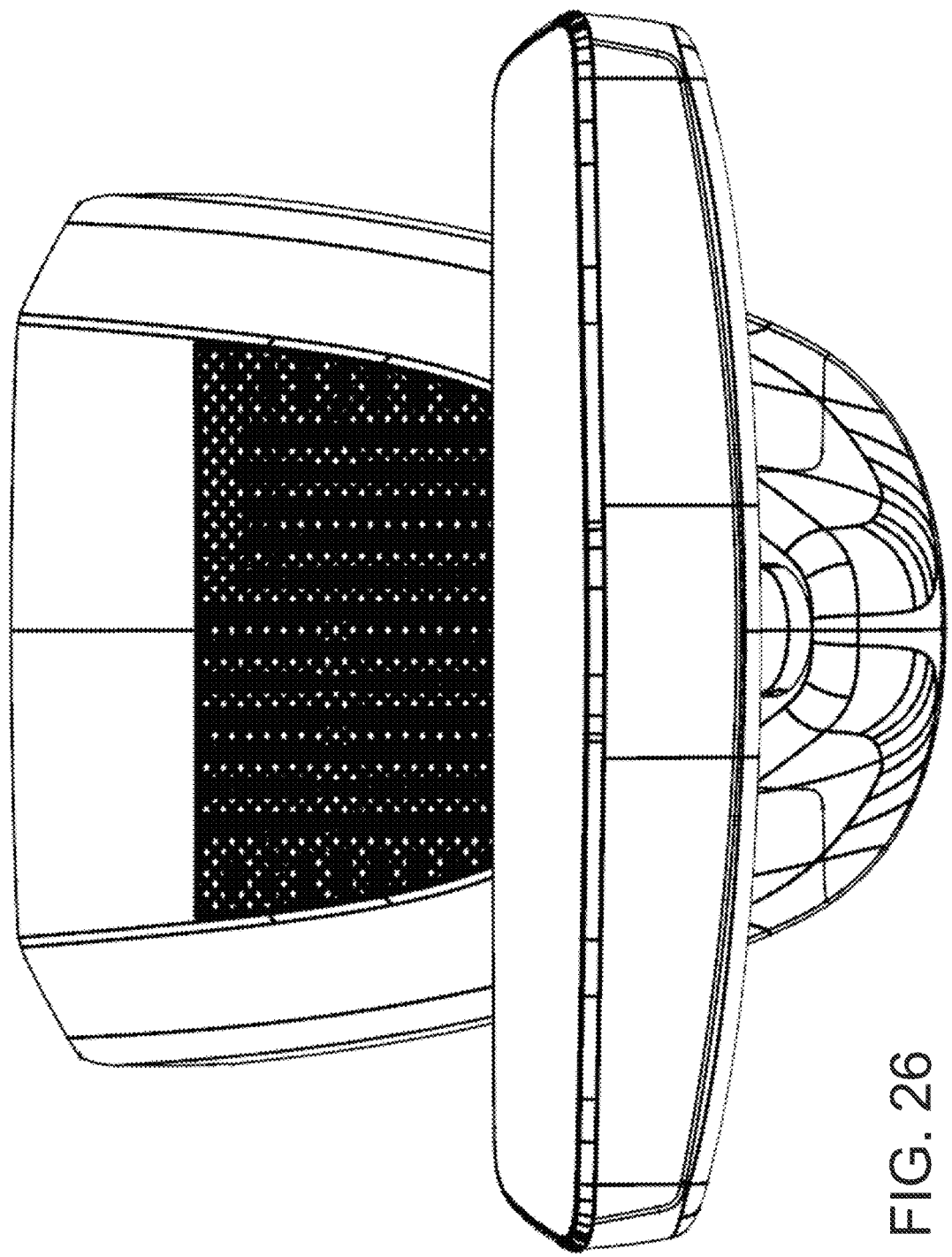

The mirror mount 20 comprises a single ball mount 20*b* for the mirror head 22 (including the mirror casing and the mirror reflective element) to pivotally attach at. The mirror mount or stay may comprise any suitable material, such as a die cast zinc or the like. The mirror assembly (including the mirror head pivotally attached at the single ball of the mirror mount) may be attached as a unit at the camera mounting bracket (either before the camera mounting bracket is attached at the windshield attachment member attached at the vehicle windshield or after the camera mounting bracket is attached at the windshield attachment member attached at the vehicle windshield). The non-circular attachment element of the mirror mount is inserted into the receiving portion of the camera mounting bracket and twisted to engage the mirror mount with and attach the mirror mount at the three pronged spring element in the receiving portion of the camera mounting bracket. The mirror mount 20 may include a locator feature 20*d* that engages a locator feature 16*b* of the camera mounting bracket 16 when the mirror mount is attached to the camera mounting bracket to provide an indication to an assembler that the mirror mount is fully installed. The mounting system of the present invention thus provides an enhanced system for attaching a mirror assembly at a camera module or bracket at a windshield of a vehicle. In the illustrated embodiment, the mirror mount 20 includes an electrical connector 20*c* that is accessible at a rear portion of the mount (FIGS. 4A, 4B, 7 and 14) for electrical connection to a connector at the camera module or of the vehicle, with the connection and any wiring of the connector being hidden within the cover 26*b* (as best shown in FIG. 14).

Figure 3A:
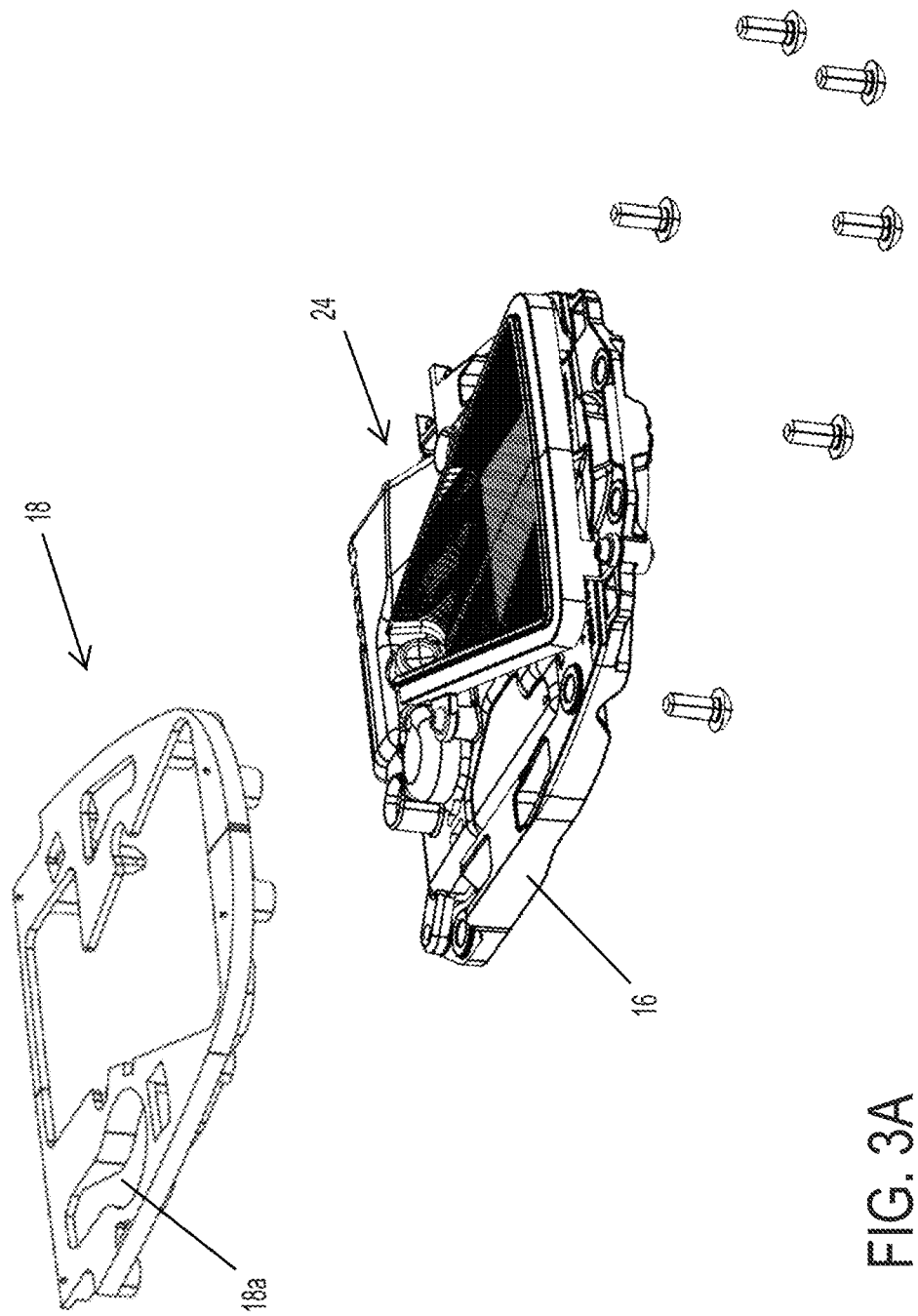
Figure 3B:
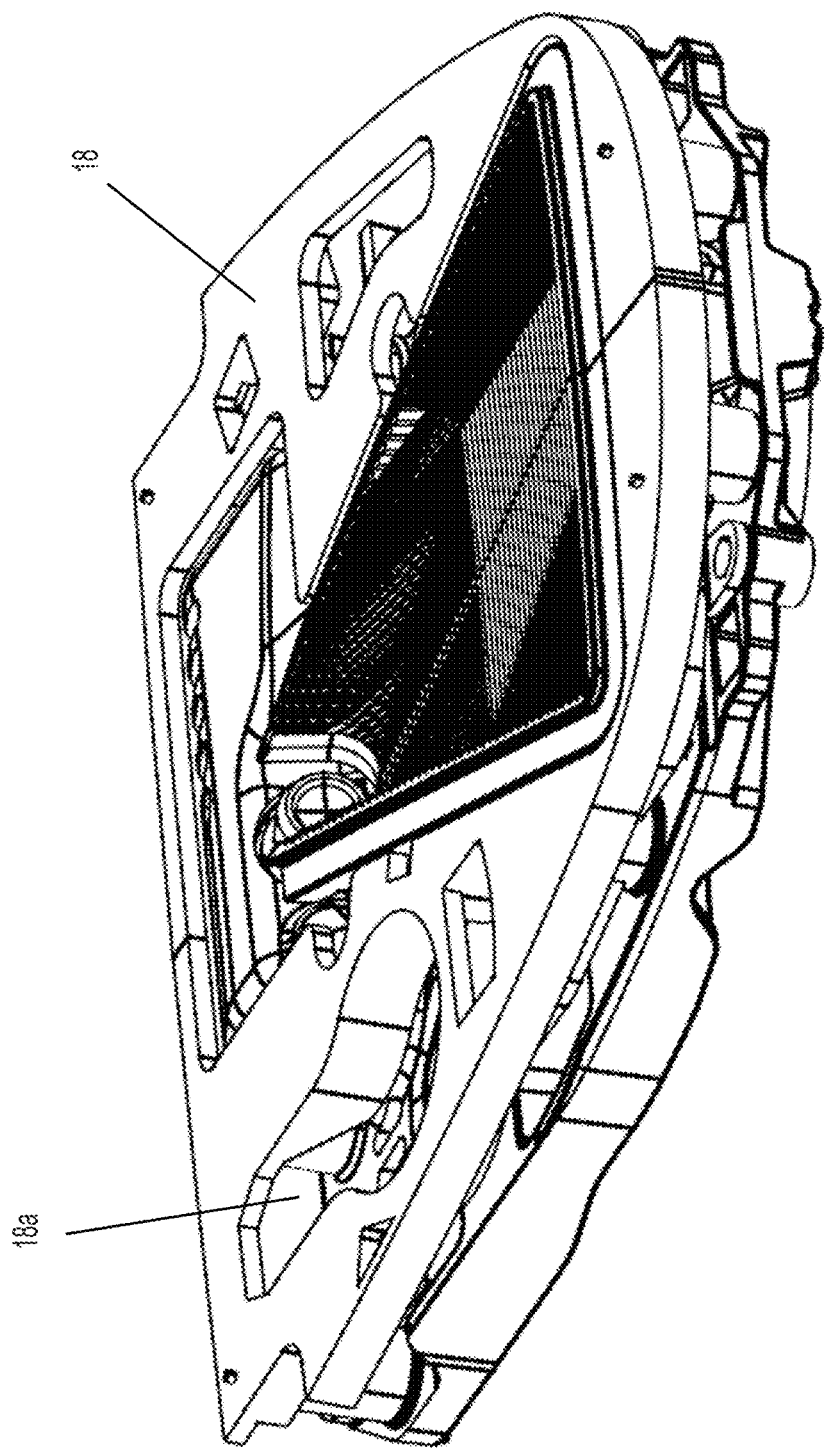
Figure 4A:
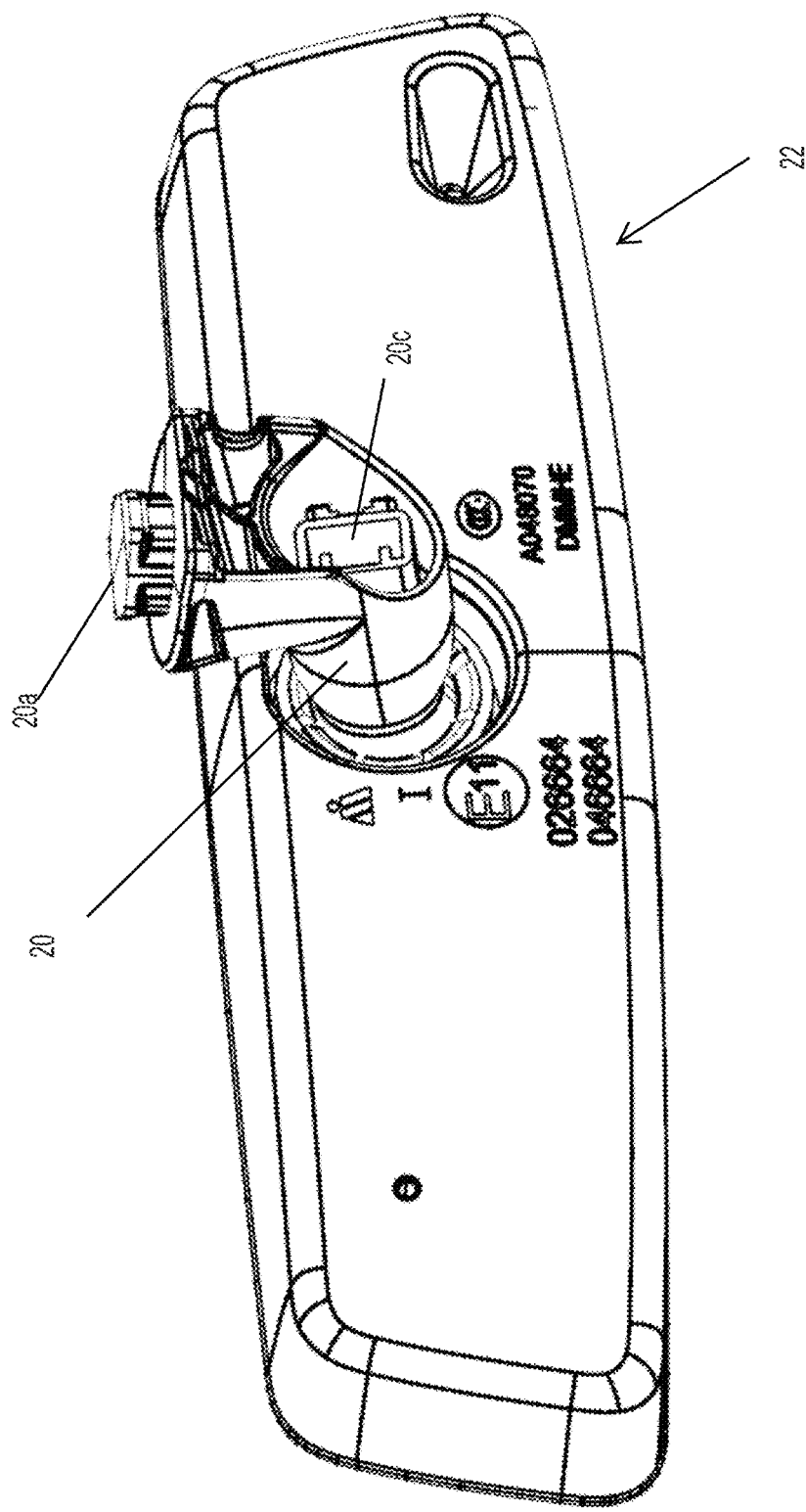
FIGS. 4A-B and 5A-C are perspective views showing the attachment of the mirror assembly to the camera mounting bracket of the mounting system of the present invention.
Figure 4B:
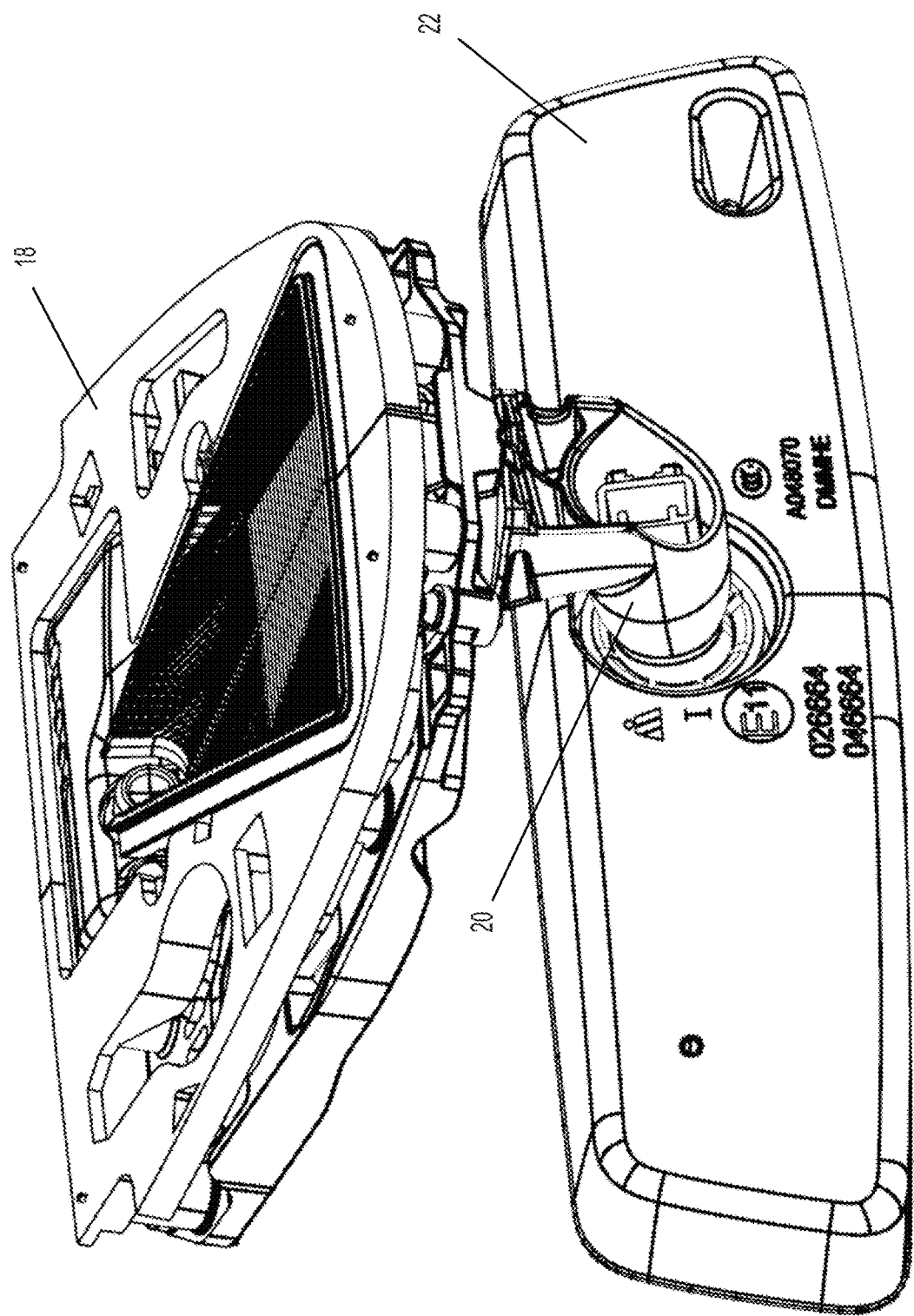
Figure 5A:
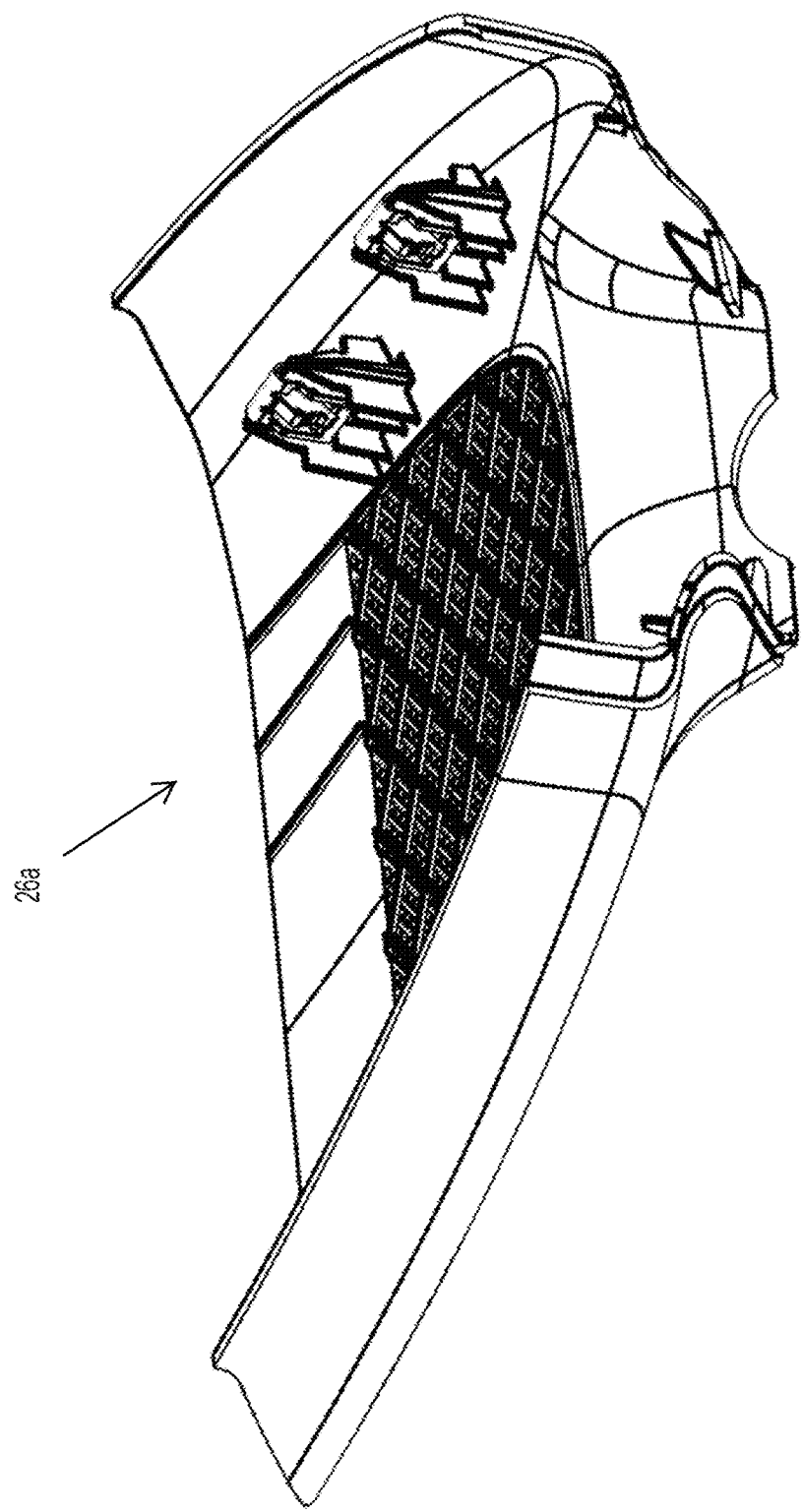
Figure 5B:
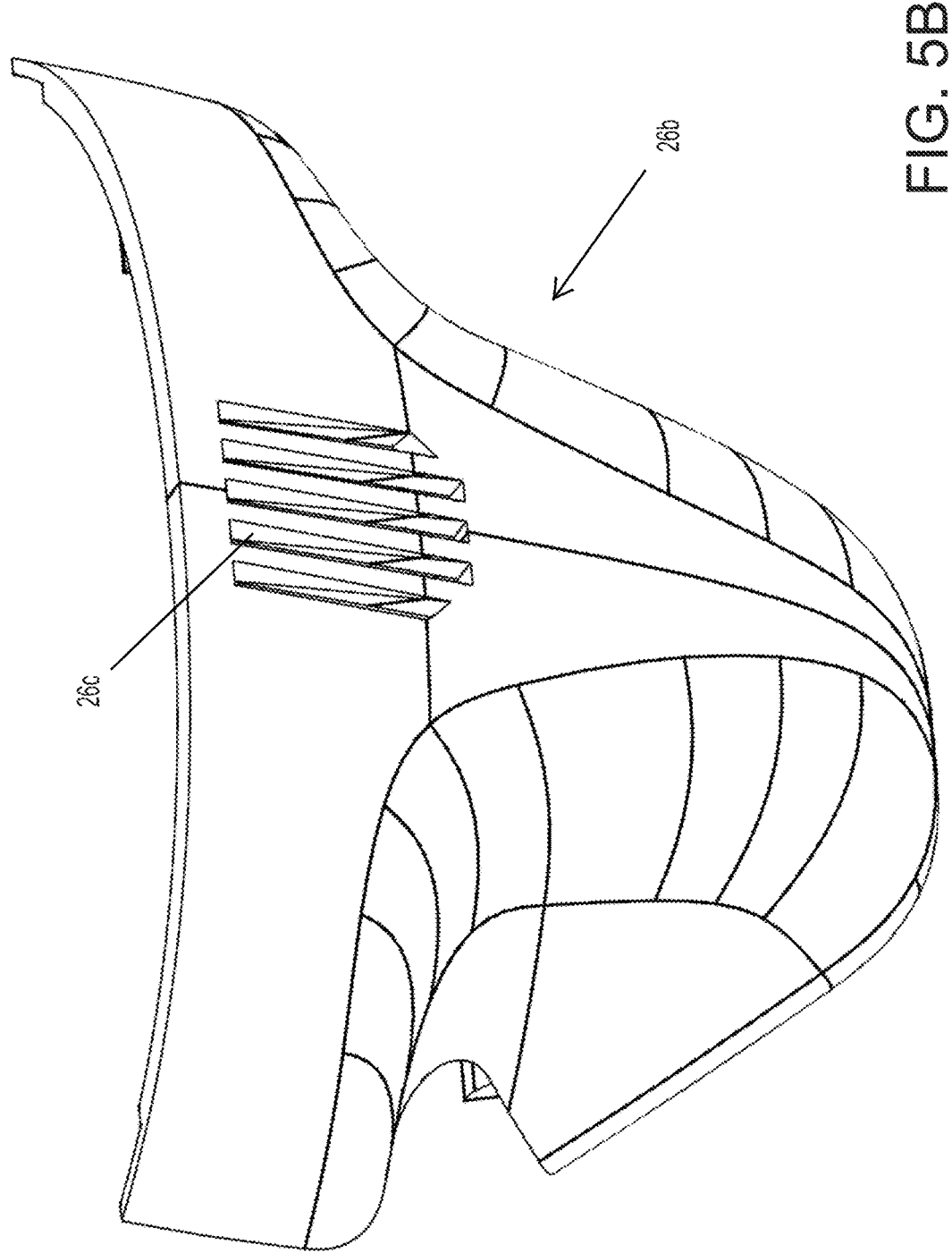
Figure 5C:
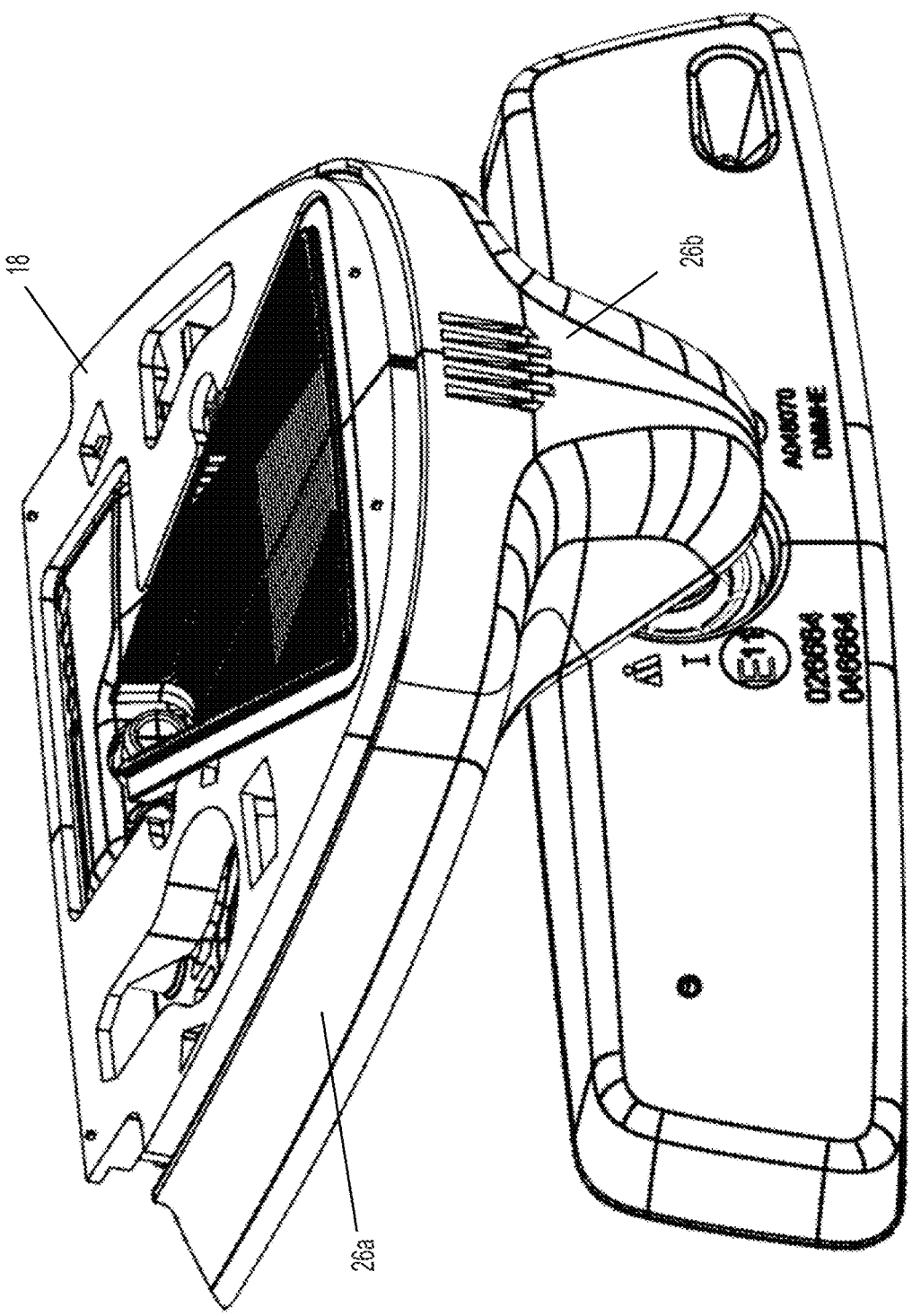
Figure 6:
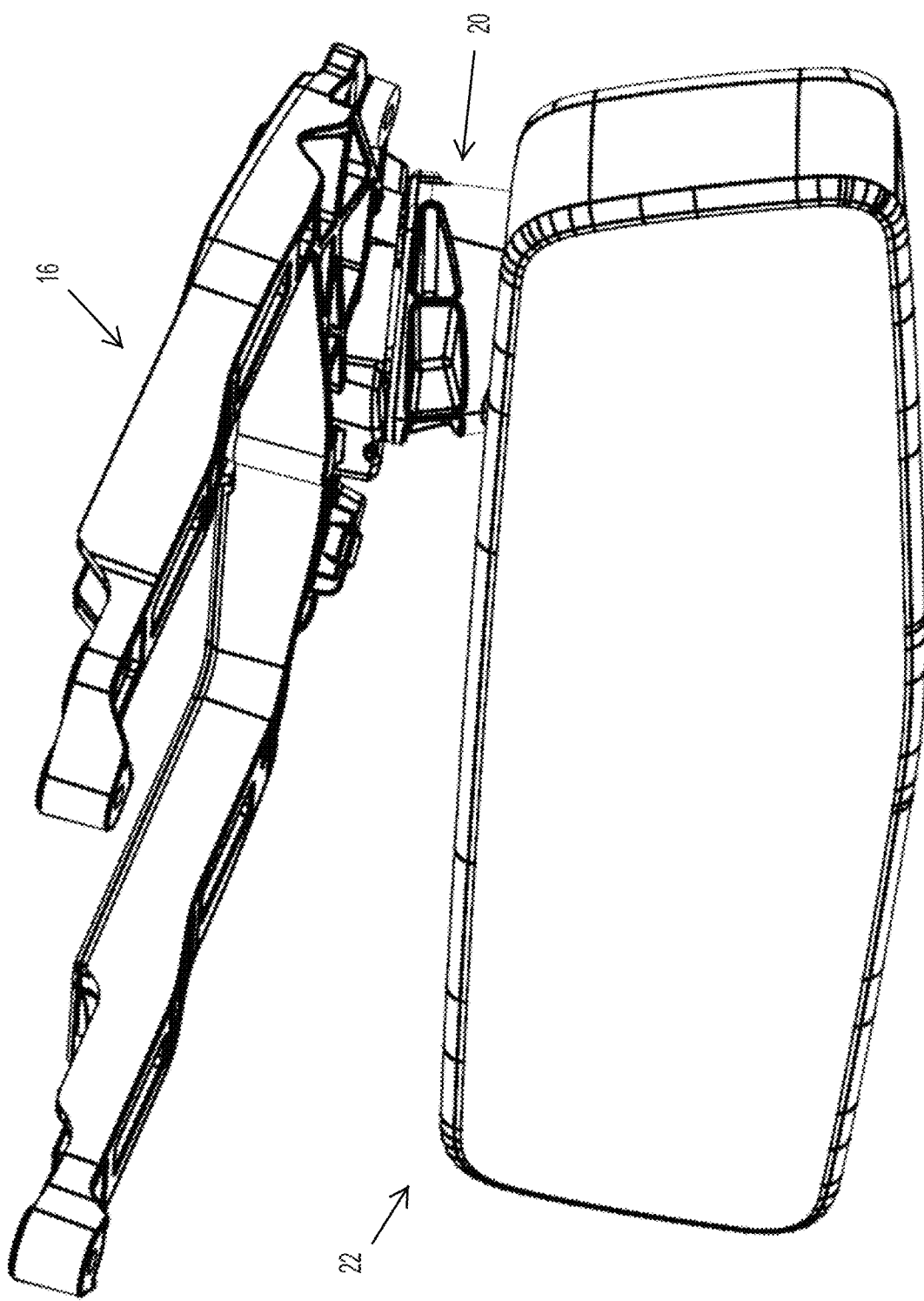
FIG. 6 is a perspective view of a mirror assembly mounted at the camera mounting bracket.

As can be seen with reference to FIGS. 2C-E and 3A-B, the camera mounting bracket 16 is configured to attach (such as via a plurality of fasteners or screws) to the windshield attachment member 18, whereby the camera lens of the camera module 24 mounted at the camera mounting bracket is disposed at and aligned with an aperture of the windshield attachment member for viewing through the windshield attachment member and through the windshield of the vehicle. The camera mounting bracket comprises a generally U-shaped bracket with the mirror attaching portion or socket at the base of the U-shaped bracket and with a plurality of fastener bosses or the like established along the bracket for attaching the camera module 24 (such as via a plurality of fasteners, such as screws or self-tapping screws or the like) to the camera mounting bracket 16 (FIGS. 2A-C) and for attaching the camera mounting bracket to the windshield attachment member (FIGS. 3A-B).

The camera mounting bracket 16 preferably comprises a molded polymeric bracket, such as formed by injection molding of a polymeric material or resin, such as a reinforced polyamide polymeric resin. The preferred material for injection molding of the camera mounting bracket of the present invention is RENY™ polymeric molding resin available from Mitsubishi Engineering Plastics Corporation, Japan. RENY™ comprises a thermoplastic polymeric molding compound based on mainly polyamide MXD6 that has been reinforced with glass fiber, carbon fiber and/or minerals and has generally superior mechanical strength and modulus compared with other engineering plastics so as to be suitable as a metal substitute but with lighter weight than metal. Optionally, other thermoplastic injection-moldable engineering plastics such as glass and/or mineral filled polyamides (nylon) or polycarbonate or acrylonitrile butadiene styrene (ABS) or a glass fiber polypropylene or the like can be used. Thus, the camera mounting bracket may comprise a strong molded bracket that has the mirror attaching portion and the fastener bosses and the like integrally or unitarily molded together so as to provide a unitary injection molded mounting bracket for the camera and mirror mount.

In the illustrated embodiment, the windshield attachment member 18 is configured to attach at the vehicle windshield, such as via direct adhesive attachment of the member to the windshield or via attachment of the member to one or more attaching elements that are adhesively attached at the windshield. Direct attachment of the windshield attachment member may be preferred over attachment via posts, because of the increased or enhanced surface area at which the member interfaces with and attaches at the windshield surface. A suitable adhesive joint to directly attach the attachment member to the windshield is formed by curing 3M structural bonding tapes (such as 9214, or 9270 or 9263) in an autoclave process during fabrication of a laminated windshield such as disclosed in U.S. Pat. No. 5,587,236, which is hereby incorporated herein by reference in its entirety. Such 3M structural bonding tapes are available from 3M Company of St. Paul, Minn. and are modified epoxy adhesive tapes. Alternately, a urethane or a silicone adhesive can be used.

The windshield attaching member 18 is attachable or adhesively attachable at the in-cabin surface of the windshield and may be attached at an area of the windshield that has an opaque hiding layer or black-out layer or the like (so that the windshield attaching member and camera mounting bracket are not viewable through the windshield by a person viewing the windshield from outside the vehicle). The windshield attachment member may be provided with a rain sensor disposed at a rain sensor opening or slot 18*a*. When the windshield attachment member is attached at the windshield, the rain sensor and/or camera may generally align with or coincide with apertures in the black-out layer so as to view through the apertures in the black-out layer and through the vehicle windshield. Optionally, the windshield attachment member may comprise a polymeric material, such as a dark or black polymeric material, such that the black-out layer may be obviated.

The windshield attachment member may be formed via any suitable forming means. For example, the windshield attachment member may comprise a metal windshield attachment member and may be formed by a metal forming process, such as, for example, die casting, sintering or the like. The windshield attachment member may comprise any suitable metal, such as, for example, aluminum or zinc or magnesium (preferred when light weight construction is desired) or the like. Alternately, the windshield attachment member may be formed of a polymeric material, such as an engineering plastic or the like, and may be formed by injection molding. Examples of suitable engineering plastics include Ultra-high-molecular-weight polyethylene (UHMWPE), Nylon 6, Nylon 6-6, Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS), Polyoxymethylene plastic (POM/Acetal), and/or blends/combinations thereof. Engineering plastics typically have high strength and have mechanical properties akin to those of metal. The windshield attachment member can be formed by injection molding of an engineering plastic. Other polymeric materials can be optionally used, such as dense polyolefins (such as polypropylene or polyethylene) or urethane or epoxy. Alternately, the windshield attachment member may be partially constructed of a plastic or polymeric material and a metal material formed together.

The windshield attachment member is configured to provide a mounting location or attachment location for a rain sensor device (FIGS. 3A-B, 4B, 5C, 15, 16 and 18-20). The rain sensor device may be received at an aperture or slot 18a of the windshield attachment member 18, such that a sensing surface of the rain sensor device may be at or optically coupled to the in-cabin surface of the windshield (when the rain sensor is mounted at the windshield attachment member and the windshield attachment member is attached at the windshield), such as via spring-loading using a resilient element to urge the rain sensor sensing surface towards the windshield. The rain sensor device may insert and/or secure at the windshield attachment member, and preferably attaches via snap attachment at one or more tabs of the windshield attachment member, when the rain sensor is disposed at the windshield attachment member, with an electrical connector (such as a multi-pin plug or socket) of the rain sensor for electrical connection to an electrical connector of a vehicle wiring harness. This aspect of the present invention can benefit from and utilize the disclosures of U.S. Pat. Nos. 6,326, 613 and/or 6,250,148, which are hereby incorporated herein by reference in their entireties.

The camera module is attached at the camera mounting bracket, which is attached at the windshield attachment member (such as via a plurality of fasteners, such as screws or machine screws or the like) to attach the camera module at the windshield of the vehicle. The camera module 24 comprises a housing 24a that houses a camera, and includes a stray light baffle or shield 24b attached at the housing. The camera system or camera module of the present invention may utilize aspects of the systems and/or modules described in U.S. provisional application 61/808,930, filed Apr. 5, 2014, and/or International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Pat. Publication No. US-2009-0295181, which are all hereby incorporated herein by reference in their entireties. In the illustrated embodiment, the camera module includes a plurality of ribs around the camera housing to assist in dissipating heat generated during operation of the camera.

The camera module may attach at the camera mounting bracket via any suitable means (such as via fasteners or screws as shown in FIG. 2), and may detachably attach so that the camera module may be detached for service or replacement while the bracket remains attached at the windshield surface. As shown in FIGS. 2-5, a stray light shield or shroud is attached (such as via a plurality of fasteners, such as screws or the like) at the camera module and/or camera mounting bracket at the camera lens barrel. When the camera module is mounted at the camera mounting bracket that is attached at the windshield attachment member at the windshield of the vehicle, the stray light shield or shroud is disposed generally at the in-cabin surface of the windshield so that the camera views through or across the recess established by the shroud and through the windshield, such as through an aperture or region of the windshield that is devoid of an opaque hiding layer or frit layer or the like.

The shroud may comprise ridges positioned (such as below and in front of the lens) to reduce the amount of light reflected into the lens (such as by utilizing aspects of the vision systems described in International Publication Nos. WO 2013/123161 and/or WO 2013/019795, which are hereby incorporated herein by reference in their entireties). Further, a shield gasket can be positioned on the frame or bracket around the lens to reduce incursion of dust, particulate, or moisture into the vicinity of the lens. The light shroud may include an adhesive layer or pad (such as a pressure sensitive adhesive layer, such as a VHB adhesive or the like, such as, for example, an Acrylic Plus Tape Series EX4000 adhesive commercially available from 3M of St. Paul, Minn.) that adheres the base of the light shroud at the camera module and/or camera mounting bracket.

The camera module and light shroud and camera mounting bracket construction or assembly may be attached at the windshield attachment member. In the illustrated embodiment, the camera mounting bracket is attached at the windshield attachment member via a plurality of fasteners or screws.

Thus, the windshield attachment member may be attached at an in-cabin surface of a vehicle windshield, and with the windshield attachment member so attached at the windshield, the rain sensor device attached at the bracket is at the in-cabin surface of the vehicle windshield. The camera module is attached at the camera mounting bracket, which is readily attached at the windshield attachment member (either before or after the bracket is attached at the windshield). The mirror mount of the mirror assembly is readily attached at the camera mounting bracket (either before or after the camera mounting bracket is attached at the windshield attachment member at the windshield). Thus, and in accordance with the present invention, the need for the automaker to attach a mirror mounting button directly to the vehicle windshield is obviated. One or more cover elements 26a, 26b (FIGS. 5A-C, 12, 18, 22 and 26) may be provided that attaches or snaps or clips at the camera mounting bracket (and/or to the camera module, the mirror mount or the windshield attachment member) to substantially encase or house the camera module and camera mounting bracket so that the camera module and bracket are not readily viewable to a person viewing the construction at the windshield from inside the vehicle cabin. The cover elements (such as cover element 26b) may include one or more slots or apertures 26c (FIG. 5B) to assist air flow through the cover and around the camera module to assist in reducing or dissipating heat generated during operation of the camera. The camera module 24 includes an electrical connector 24c (such as a multi-pin connector or the like at an upper or rearward portion of the camera module) for electrically connecting circuitry of the camera module (and/or circuitry of the mirror head) to a wiring harness of the vehicle when the camera mounting bracket and camera module are mounted at the windshield attachment member.

Although shown and described as attaching at the bracket via a twist-lock connection, the mirror mount or mirror stay may attach at the camera mounting bracket via other suitable means. For example, and in accordance with the present invention, and with reference to FIGS. 27 and 28, the mirror mount attaches via a rotatably driven fastener (such as a threaded screw or bolt) that threadedly engages a threaded insert at the camera mounting bracket. Such an attachment may be preferred in situations where there is reduced clearance at the cover, because the mirror mount does not have to rotate relative to the camera mounting bracket to attach. Thus, the mirror mount can be attached at the camera mounting bracket after the cover is in place and can be positioned at the camera mounting bracket, whereby a fastener driving tool (such as a screw driver or the like) is inserted into and through a passageway of the mirror mount and engages the fastener and may rotatably drive the fastener to thread the fastener into the threaded insert of the camera mounting bracket.

Figure 27:
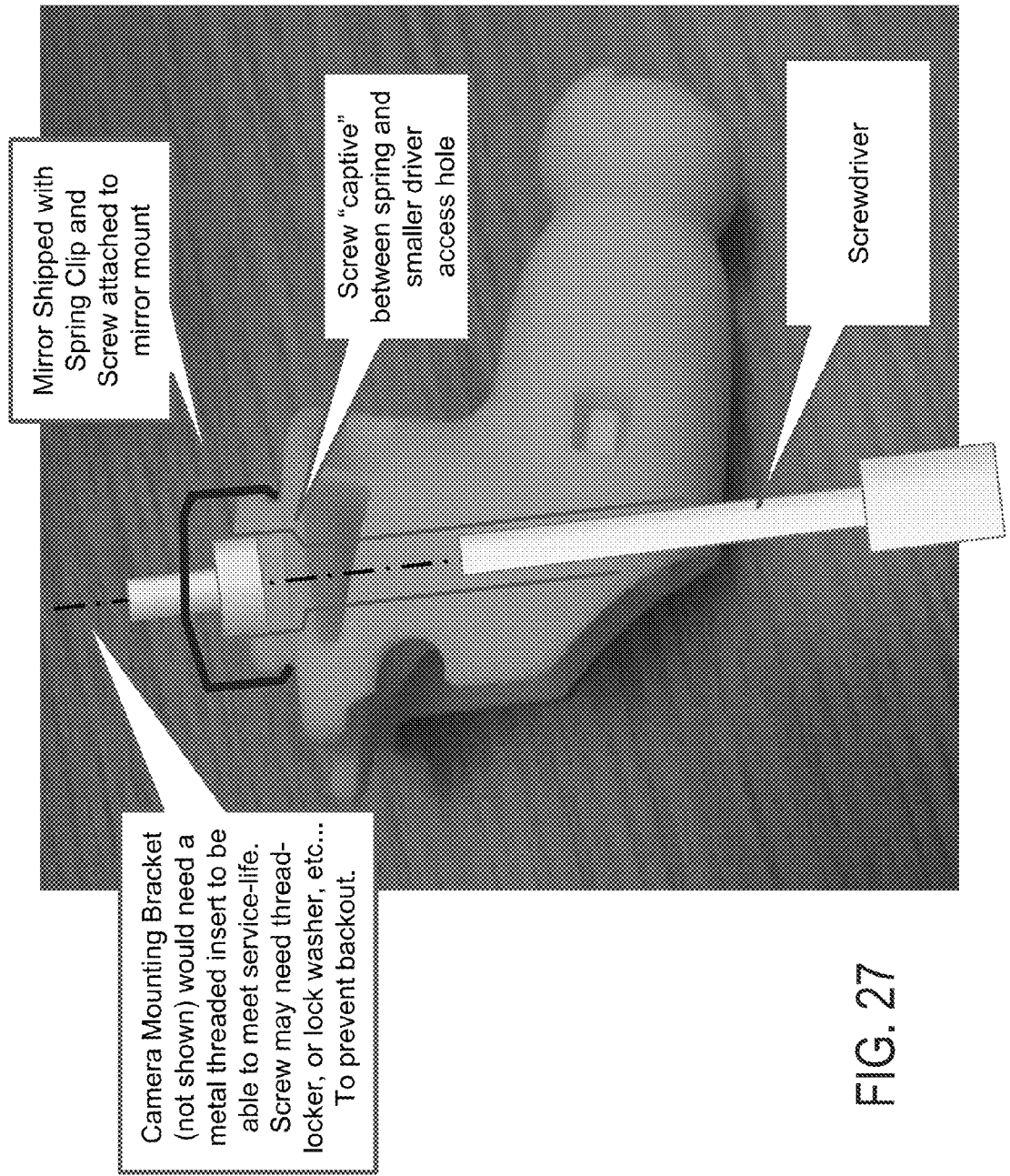
FIG. 27 is a perspective view of a mirror mount of the mounting system of the present invention, shown with a passageway for receiving a driving tool therethrough to fasten the mirror mount to the camera mounting bracket, and shown with a clip that holds the fastener at the mirror mount, such as during shipping of the mirror mount.

As shown in FIG. 27, the mirror mount includes a threaded fastener at its base or attaching portion, with a spring clip to retain the fastener in place before the mirror mount is attached to the bracket, such as during shipping of the mirror mount or mount. The fastener is thus retained between the spring clip and the smaller driver access hole or passageway that extends through the mirror mount.

The camera mounting bracket may include a metal threaded insert that receives the fastener. Optionally, the fastener may include a thread-lock adhesive or the like or a lock washer or the like to enhance retention and limit backout of the fastener over the life of the vehicle equipped with the mirror assembly and mounting system of the present invention.

Figure 28:
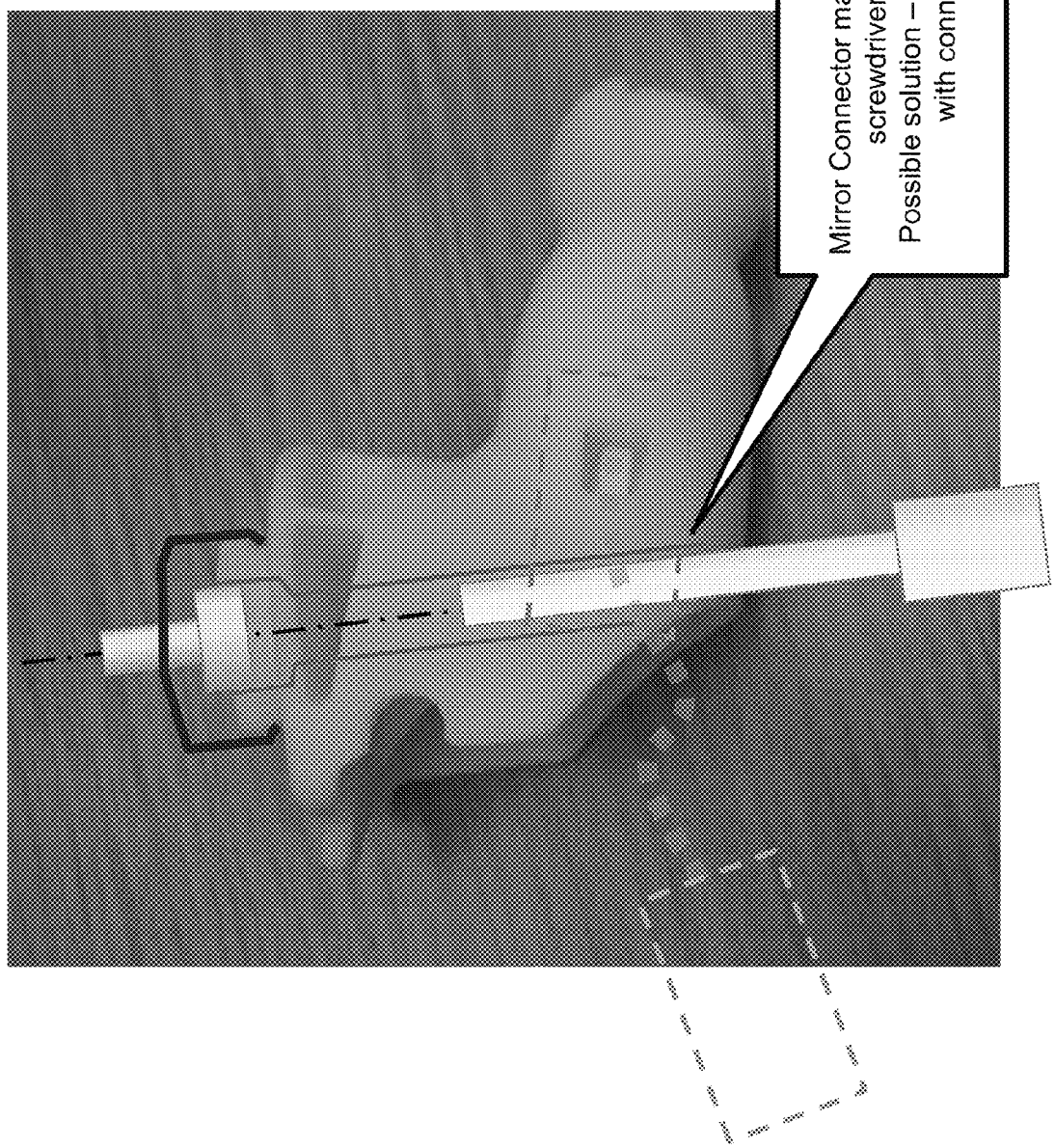
FIG. 28 is another perspective view of the mirror mount of FIG. 27, showing where an electrical wire harness or connector may be disposed at the mirror mount.

Thus, the mirror mount may be readily attached at the camera mounting bracket via a driving tool or screwdriver that is inserted through the passageway of the mirror mount to rotatably drive the fastener into the camera mounting bracket. As shown in FIG. 28, the mirror mount may be shipped with a wiring harness and electrical connector, which may be located at or near or through the passageway for the tool. Thus, the wiring harness may be extended so that the connector is outside of the mirror mount during attachment of the mirror mount to the camera mounting bracket, whereby the harness and connector can be moved or inserted or pushed into the mirror mount after the mirror mount is secured at the camera mounting bracket. Optionally, the mirror mount may be shipped with the connector loose, whereby the connector may be secured at and electrically connected at the mirror mount and vehicle wiring harness or circuitry of the camera module at the vehicle assembly plant.

Optionally, the camera module may include ventilation means for ventilating the module at the windshield (such as by utilizing aspects of the modules described in U.S. Publication No. US-2009-0295181, which is hereby incorporated herein by reference in its entirety). For example, the ventilation means may comprise one or more vents or ports or ventilation openings (such as a vent or port or opening established through the housing and/or gasket and/or frame or the like), a gas permeable and fluid impermeable material, a baffle that passes air and that blocks moisture, and/or a breathable membrane and/or the like. Such ventilation means may be provided to reduce moisture or fogging of the windshield at the viewing area of the camera or imager. Optionally, a localized heater element or grid may be established at the windshield (such as a conductive trace, such as a transparent conductive trace or the like, established at the in-cabin surface of the windshield local to the camera module) to provide heating of the windshield at the area through which the camera views, in order to reduce moisture or fogging of the windshield at the viewing area of the camera or imager.

Optionally, the camera module and camera may utilize aspects of the imaging systems and/or modules described in U.S. Pat. Nos. 8,451,332; 8,256,821; 7,946,505; 7,188,963; 7,004,593; 6,824,281; 6,968,736; 6,690,268; 6,250,148; 6,341,523; 6,593,565; 6,428,172; 6,501,387; 6,329,925 and/or 6,326,613, and/or U.S. Publication No. US-2006-0050018, which are all hereby incorporated herein by reference in their entireties.

The windshield may have an opaque or light absorbing or non-light-transmitting layer (such as an opaque ceramic frit layer or the like) disposed at the area of the windshield at which the windshield attachment member is mounted, with an aperture established through the opaque layer generally at the area in front of and generally aligned with the imager assembly when the camera mounting bracket and camera module are attached at the windshield attachment member at the windshield and with the same aperture or a second aperture also aligned with any rain sensor used, so that the camera and the rain sensor can view through the windshield through the aperture or apertures formed through the opaque frit layer.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The vehicle and/or vision system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, a video mirror display may be disposed rearward of and behind the reflective element assembly of the mirror assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicle mirror and camera mounting system comprising:
    a windshield attachment member configured to adhesively attach at an in-cabin surface of a windshield of a vehicle equipped with said mirror and camera mounting system;
    a camera mounting bracket configured to attach at said windshield attachment member when said windshield attachment member is adhesively attached at the in-cabin surface of the windshield of the equipped vehicle;
    wherein said camera mounting bracket comprises an injection molded bracket that is formed by injection molding a thermoplastic polymeric molding resin, said thermoplastic polymeric molding resin comprising a reinforced polyamide polymeric molding resin;
    a camera module attached at said camera mounting bracket, wherein said camera module comprises a camera having an image sensor array and a lens;
    wherein said camera mounting bracket, with said camera module attached thereat, is attached at said windshield attachment member attached at the in-cabin surface of the windshield;
    wherein said camera, when said camera module is attached at said camera mounting bracket and with said camera mounting bracket attached at said windshield attachment member adhesively attached at the in-cabin surface of the windshield of the equipped vehicle, has a field of view through the windshield of the equipped vehicle;
    an interior rearview mirror assembly comprising a mirror head pivotally mounted at a mirror mount;
    wherein said camera mounting bracket includes a mirror attachment portion for attaching said interior rearview mirror assembly thereat, and wherein said mirror attachment portion comprises a socket; and
    wherein said mirror mount comprises an attaching portion that is configured to insert at least partially into said socket of said mirror attachment portion of said camera mounting bracket to attach said interior rearview mirror assembly at said camera mounting bracket,
    a spring element disposed at said socket and configured to engage and retain said attaching portion of said mirror mount when said attaching portion is at least partially received in said socket,
    wherein said spring element engages and retains said attaching portion of said mirror mount when said attaching portion is inserted into said socket and twisted about an axis of said socket, and
    wherein said spring element comprises a three lobed spring element having three tabs that engage three tabs of said attaching portion of said mirror mount when said attaching portion is inserted into said socket and twisted about the axis of said socket.

2. The vehicle mirror and camera mounting system of claim 1, wherein, with said camera mounting bracket attached at said windshield attachment member adhesively attached at the in-cabin surface of the windshield, said mirror mount of said interior rearview mirror assembly is attachable to said socket of said mirror attachment portion of said camera mounting bracket.

3. The vehicle mirror and camera mounting system of claim 1, wherein said attaching portion and said socket are configured so that said socket attaches said attaching portion via a twist-lock attachment.

4. The vehicle mirror and camera mounting system of claim 1, comprising a stray light shroud attached at one of said camera module and said camera mounting bracket, wherein, when said camera module is mounted at said camera mounting bracket and said camera mounting bracket is attached at said windshield attachment member adhesively attached at the in-cabin surface of the windshield, said stray light shroud shields said image sensor array from light emanating from within the cabin of the equipped vehicle.

5. The vehicle mirror and camera mounting system of claim 4, wherein said stray light shroud is disposed at said camera module and said lens views via a pocket of said stray light shroud and through the windshield of the equipped vehicle.

6. The vehicle mirror and camera mounting system of claim 1, wherein said windshield attachment member includes a rain sensor attachment portion, and wherein, with said windshield attachment member attached at the in-cabin surface of the windshield, a rain sensor is mountable to said rain sensor attachment portion of said windshield attachment member.

7. The vehicle mirror and camera mounting system of claim 1, wherein said camera mounting bracket comprises a generally U-shaped bracket.

8. The vehicle mirror and camera mounting system of claim 1, wherein said reinforced polyamide polymeric molding resin comprises at least one of (i) a thermoplastic glass fiber reinforced polyamide polymeric molding resin, (ii) a thermoplastic carbon fiber reinforced polyamide polymeric molding resin and (iii) a thermoplastic mineral reinforced polyamide polymeric molding resin.

9. The vehicle mirror and camera mounting system of claim 1, wherein said reinforced polyamide polymeric molding resin comprises a thermoplastic glass fiber reinforced polyamide polymeric molding resin.

10. A vehicle mirror and camera mounting system comprising:
- a windshield attachment member configured to adhesively attach at an in-cabin surface of a windshield of a vehicle equipped with said mirror and camera mounting system;
- a camera mounting bracket configured to attach at said windshield attachment member when said windshield attachment member is adhesively attached at the in-cabin surface of the windshield of the equipped vehicle;
- wherein said camera mounting bracket comprises an injection molded bracket that is formed by injection molding a thermoplastic polymeric molding resin, said thermoplastic polymeric molding resin comprising at least one of (i) a thermoplastic glass fiber reinforced polyamide polymeric molding resin, (ii) a thermoplastic carbon fiber reinforced polyamide polymeric molding resin and (iii) a thermoplastic mineral reinforced polyamide polymeric molding resin;
- a camera module attached at said camera mounting bracket, wherein said camera module comprises a camera having an image sensor array and a lens;
- wherein said camera mounting bracket, with said camera module attached thereat, is attached at said windshield attachment member attached at the in-cabin surface of the windshield;
- wherein said camera, when said camera module is attached at said camera mounting bracket and with said camera mounting bracket attached at said windshield attachment member adhesively attached at the in-cabin surface of the windshield of the equipped vehicle, has a field of view through the windshield of the equipped vehicle;
- an interior rearview mirror assembly comprising a mirror head pivotally mounted at a mirror mount;
- wherein said camera mounting bracket includes a mirror attachment portion for attaching said interior rearview mirror assembly thereat, and wherein said mirror attachment portion comprises a socket;
- a spring element disposed at said socket and configured to engage and retain an attaching portion of said minor mount when said attaching portion is at least partially received in said socket; and
- wherein said attaching portion is configured to insert at least partially into said socket of said mirror attachment portion of said camera mounting bracket and engage said spring element to attach said interior rearview minor assembly at said camera mounting bracket,
- wherein said spring element engages and retains said attaching portion of said mirror mount when said attaching portion is inserted into said socket and twisted about an axis of said socket, and
- wherein said spring element comprises a three lobed spring element having three tabs that engage three tabs of said attaching portion of said mirror mount when said attaching portion is inserted into said socket and twisted about the axis of said socket.

11. The vehicle mirror and camera mounting system of claim 10, wherein, with said camera mounting bracket attached at said windshield attachment member adhesively attached at the in-cabin surface of the windshield, said mirror mount of said interior rearview mirror assembly is attachable to said socket of said mirror attachment portion of said camera mounting bracket.

12. The vehicle mirror and camera mounting system of claim 10, wherein said attaching portion and said spring element and said socket are configured so that said spring element and said socket attaches said attaching portion via a twist-lock attachment.

13. A vehicle mirror and camera mounting system comprising:
- a windshield attachment member configured to adhesively attach at an in-cabin surface of a windshield of a vehicle equipped with said mirror and camera mounting system;
- a camera mounting bracket configured to attach at said windshield attachment member when said windshield attachment member is adhesively attached at the in-cabin surface of the windshield of the equipped vehicle;
- wherein said camera mounting bracket comprises an injection molded bracket that is formed by injection molding a thermoplastic polymeric molding resin, said thermoplastic polymeric molding resin comprising a reinforced polyamide polymeric molding resin;
- a camera module attached at said camera mounting bracket, wherein said camera module comprises a camera having an image sensor array and a lens;
- wherein said camera mounting bracket, with said camera module attached thereat, is attached at said windshield attachment member attached at the in-cabin surface of the windshield;
- wherein said camera, when said camera module is attached at said camera mounting bracket and with said camera mounting bracket attached at said windshield attachment member adhesively attached at the in-cabin surface of the windshield of the equipped vehicle, has a field of view through the windshield of the equipped vehicle;
- an interior rearview minor assembly comprising a minor head pivotally mounted at a mirror mount, wherein said mirror mount comprises a metallic mirror mount and wherein said mirror head is pivotally mounted at a ball element of said mirror mount;
- wherein said camera mounting bracket includes a mirror attachment portion for attaching said interior rearview mirror assembly thereat, and wherein said mirror attachment portion comprises a socket;
- a spring element disposed at said socket and configured to engage and retain an attaching portion of said mirror mount when said attaching portion is at least partially received in said socket;
- wherein said attaching portion is configured to insert at least partially into said socket of said mirror attachment portion of said camera mounting bracket and engage said spring element to attach said interior rearview minor assembly at said camera mounting bracket;
- wherein said spring element engages and retains said attaching portion of said mirror mount when said attaching portion is inserted into said socket and twisted about an axis of said socket; and
- wherein said spring element comprises a three lobed spring element having three tabs that engage three tabs of said attaching portion of said minor mount when said attaching portion is inserted into said socket and twisted about the axis of said socket.

14. The vehicle mirror and camera mounting system of claim 13, wherein said reinforced polyamide polymeric molding resin comprises at least one of (i) a thermoplastic glass fiber reinforced polyamide polymeric molding resin, (ii) a thermoplastic carbon fiber reinforced polyamide polymeric molding resin and (iii) a thermoplastic mineral reinforced polyamide polymeric molding resin.

* * * * *